(12) United States Patent
Jang et al.

(10) Patent No.: US 9,723,383 B2
(45) Date of Patent: Aug. 1, 2017

(54) METHOD AND APPARATUS FOR RECOGNIZING USER'S ACTIVITY USING ACCELEROMETER

(71) Applicant: Samsung Electronics Co., Ltd., Suwon-si, Gyeonggi-do (KR)

(72) Inventors: Ji-hoon Jang, Suwon-si (KR); Melnichenko Dmitry, Vyshneve (UA); Danylo Dorofieiev, Laduzhin (UA); Oleksandr Viatchaninov, Village Bila (UA); Sergey Strelkovsky, Kyiv (UA); Volodymyr Manilo, Sadky (UA); Du-seok Kim, Yongin-si (KR); Hyun-cheol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/051,302

(22) Filed: Feb. 23, 2016

(65) Prior Publication Data

US 2016/0279501 A1    Sep. 29, 2016

(30) Foreign Application Priority Data

Mar. 27, 2015 (KR) .................. 10-2015-0043459

(51) Int. Cl.
| | |
|---|---|
| G08C 19/22 | (2006.01) |
| H04Q 9/00 | (2006.01) |
| G01S 19/19 | (2010.01) |
| H04M 1/725 | (2006.01) |
| G06K 9/00 | (2006.01) |

(52) U.S. Cl.
CPC ............... *H04Q 9/00* (2013.01); *G01S 19/19* (2013.01); *G06K 9/00335* (2013.01); *H04M 1/725* (2013.01); *H04Q 2209/40* (2013.01); *H04Q 2209/43* (2013.01); *H04Q 2209/823* (2013.01); *H04Q 2209/86* (2013.01)

(58) Field of Classification Search
CPC .................... G01C 22/006; A63B 71/0619
USPC ...................... 340/870.07; 702/104, 160
See application file for complete search history.

(56) References Cited

U.S. PATENT DOCUMENTS

| | | |
|---|---|---|
| 7,768,393 B2 | 8/2010 | Nigam |
| 8,779,918 B2 | 7/2014 | Housley |

(Continued)

FOREIGN PATENT DOCUMENTS

| | | |
|---|---|---|
| KR | 10-2012-0100059 A | 9/2012 |
| KR | 10-2014-0077321 A | 6/2014 |

(Continued)

*Primary Examiner* — Ojiako Nwugo
(74) *Attorney, Agent, or Firm* — Jefferson IP Law, LLP

(57) ABSTRACT

A device is provided. The device includes an accelerometer configured to measure an acceleration of the device, a controller configured to acquire acceleration data of the device in a first time period and a second time period adjacent to the first time period from the accelerometer, determine a first movement state of a user in the first time period based on the acceleration data corresponding to the first time period, and determine a second movement state of the user in the second time period in consideration of the acceleration data corresponding to the second time period and the determined first movement state, and a display configured to display the first movement state and the second movement state.

18 Claims, 32 Drawing Sheets

(56) References Cited

U.S. PATENT DOCUMENTS

| | | | |
|---|---|---|---|
| 2010/0010774 A1* | 1/2010 | Ma | G01C 22/006 |
| | | | 702/160 |
| 2013/0179110 A1 | 7/2013 | Lee | |
| 2014/0257535 A1* | 9/2014 | Morris | A61B 5/1118 |
| | | | 700/91 |
| 2014/0378786 A1 | 12/2014 | Hong et al. | |

FOREIGN PATENT DOCUMENTS

| | | |
|---|---|---|
| KR | 10-1489619 B1 | 2/2015 |
| WO | 2011-070831 A1 | 6/2011 |

\* cited by examiner

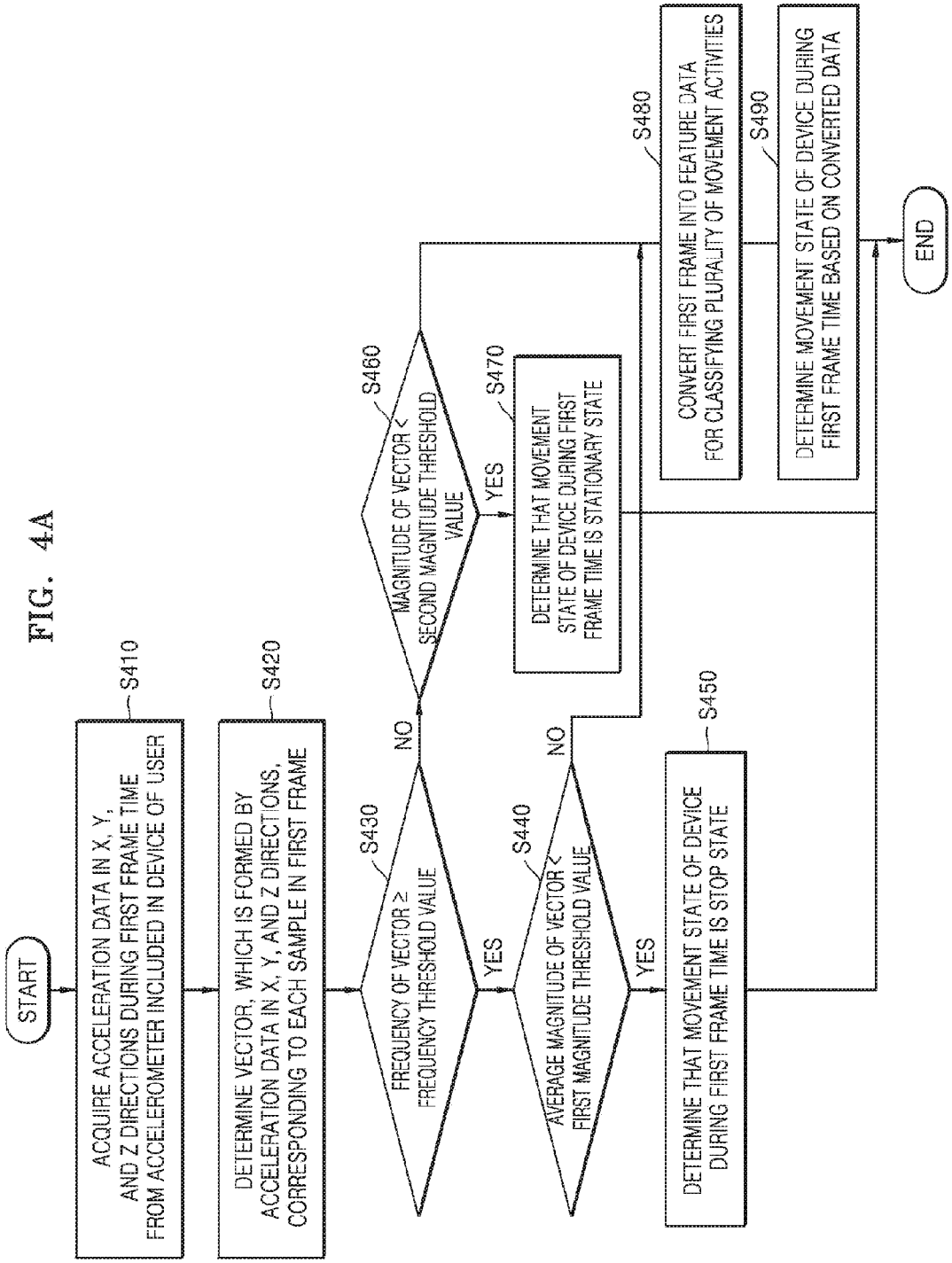

FIG. 4B

| MOVEMENT STATE | FREQUENCY | AVERAGE MAGNITUDE VALUE |
|---|---|---|
| STOP STATE | GREATER THAN FREQUENCY THRESHOLD VALUE | LESS THAN FIRST MAGNITUDE THRESHOLD VALUE |
| STATIONARY STATE | LESS THAN FREQUENCY THRESHOLD VALUE | LESS THAN SECOND MAGNITUDE THRESHOLD VALUE (<LESS THAN FIRST MAGNITUDE THRESHOLD VALUE) |
| OTHER STATES | LESS THAN FREQUENCY THRESHOLD VALUE | LESS THAN FIRST MAGNITUDE THRESHOLD VALUE |

FIG. 4C

| MOVEMENT STATE | SECOND MAGNITUDE VALUE |
|---|---|
| STOP STATE | T1 |
| OTHER STATES | T2( > T1) |

|  | Transition State — 720 | | | | |
|---|---|---|---|---|---|
| 710<br>Current State | Stationary | Walking | (Running) | Car Driving | Bicycle |
| Stationary | 1 | 1 | 1 | 1 | 1 |
| Walking | 1 | 1 | 1 | 0 | 0 |
| (Running) | 1 | 1 | (1) | 0 | (0) |
| Car Driving | 1 | 1 | 0 | 1 | 0 |
| Bicycle | 1 | 1 | 0 | 0 | 1 |

NET OUTPUT

| Activity | Probability | |
|---|---|---|
| stationary | 0.12 | |
| walking | 0.34 | |
| jogging | 0.65 | Next biggest probability |
| car driving | 0.18 | |
| cycling | 0.79 | Max probability |

FIG. 11

| TIME | MOVEMENT STATE | DURATION |
|---|---|---|
| ... | ... | ... |
| 2015/ 03/21 PM 11:33:23 | STATIONARY | 7 HOURS 57 MINUTES 11 SECONDS |
| 2015/ 03/22 AM 07:25:34 | WALKING | 57 SECONDS |
| 2015/ 03/22 AM 07:26:31 | STATIONARY | 15 SECONDS |
| 2015/ 03/22 AM 07:26:46 | WALKING | 2 SECONDS |
| 2015/ 03/22 AM 07:26:48 | ELEVATORDOWN | 12 SECONDS |
| 2015/ 03/22 AM 07:27:00 | WALKING | 30 SECONDS |
| 2015/ 03/22 AM 07:27:30 | STATIONARY | 8 SECONDS |
| 2015/ 03/22 AM 07:27:38 | DRIVING/STATIONARY IN CAR | 48 MINUTES 13 SECONDS |
| 2015/ 03/22 AM 08:15:51 | WALKING | 33 SECONDS |
| 2015/ 03/22 AM 08:16:24 | STATIONARY | 30 SECONDS |
| 2015/ 03/22 AM 08:16:54 | WALKING | 3 SECONDS |
| 2015/ 03/22 AM 08:16:57 | ELEVATORUP | 50 SECONDS |
| 2015/ 03/22 AM 08:17:46 | WALKING | 20 SECONDS |
| 2015/ 03/22 AM 08:18:06 | STATIONARY | 1 HOURS 40 MINUTES 41 SECONDS |
| 2015/ 03/22 AM 09:58:47 | WALKING | 23 SECONDS |
| 2015/ 03/22 AM 09:59:10 | STATIONARY | 42 MINUTES 17 SECONDS |
| 2015/ 03/22 AM 10:41:27 | WALKING | 50 SECONDS |
| 2015/ 03/22 AM 10:42:17 | STATIONARY | 1 HOURS 20 MINUTES 18 SECONDS |
| 2015/ 03/22 AM 12:02:35 | WALKING/DOWNSTAIRS | 10 MINUTES 51 SECONDS |
| 2015/ 03/22 AM 12:13:26 | STATIONARY | 35 MINUTES 28 SECONDS |
| 2015/ 03/22 AM 12:48:54 | WALKING | 50 SECONDS |
| ... | ... | ... |

METHOD AND APPARATUS FOR RECOGNIZING USER'S ACTIVITY USING ACCELEROMETER

CROSS-REFERENCE TO RELATED APPLICATION(S)

This application claims the benefit under 35 U.S.C. §119(a) of a Korean patent application filed on Mar. 27, 2015 in the Korean Intellectual Property Office and assigned Serial number 10-2015-0043459, the entire disclosure of which is hereby incorporated by reference.

TECHNICAL FIELD

The present disclosure relates to a method and apparatus for recognizing a user's activity using an accelerometer.

BACKGROUND

Along with the development of sensor technology, one device is provided with various sensors. In addition, techniques for recognizing a context or activity of a user of a device using sensors included in the device have also developed.

Various sensors may be needed to recognize a user's context. However, high power is needed to use many sensors, and high power consumption may be an issue in mobile devices. Also, various sensors inevitably cause devices to increase in size.

Currently, a dedicated sensor processor is being used to process various sensors. A dedicated sensor processor is a processor (e.g., a microcontroller unit, a coprocessor, or a digital signal processor (DSP)) that acquires data from various sensors included in a device and integratedly processes the acquired data. Power consumed when sensors are used may be reduced by using a dedicated sensor processor.

However, there is a limitation in reducing the amount of power consumption by using the dedicated sensor processor. Furthermore, it may be difficult to use various sensors together because of limitations in pricing or size of the device.

Accordingly, there is a need for a technique that may recognize a user's context or activity using a low power consumption sensor or a minimum number of sensors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for recognizing a user's activity using an accelerometer.

Additional aspects will be set forth in part in the description which follows and, in part, will be apparent from the description, or may be learned by practice of the presented embodiments.

In accordance with an aspect of the present disclosure, a device is provided. The device includes an accelerometer configured to measure an acceleration of the device, a controller configured to acquire acceleration data of the device in a first time period and a second time period adjacent to the first time period from the accelerometer, determine a first movement state of a user in the first time period based on the acceleration data corresponding to the first time period, and determine a second movement state of the user in the second time period in consideration of the acceleration data corresponding to the second time period and the determined first movement state, and a display configured to display the first movement state and the second movement state.

Each of the movement states may indicate one of a plurality of predetermined movement activities of the user, and the plurality of movement activities may include at least one of a stationary activity, a stop activity, a walking activity, a jogging activity, a cycling activity, and a driving activity.

The second time period may partially overlap the first time period.

The controller may create feature data for classifying the plurality of movement activities using the acceleration data corresponding to the first time period and may determine the movement state of the user in the first time period based on the created data.

The feature data for classifying the plurality of movement activities is at least one of a magnitude, standard deviation, frequency, and energy of the acceleration data.

The controller may determine the second movement state in consideration of the first movement state by determining the second movement state based on a possibility of occurrence of each of the plurality of movement activities as a next movement state of the first movement state when the first movement state occurs in the first time period.

The controller may determine the second movement state in consideration of the first movement state by using the acceleration data corresponding to the second time period to create feature data for classifying the plurality of movement activities and determine a threshold value based on the first movement state and comparing the created feature data with the threshold value to determine the second movement state.

The feature data may be an average magnitude of the acceleration data, the controller may determine the movement state of the user in the second time period as a stationary state when the average magnitude of the acceleration data is less than the threshold value, and the threshold value may be determined as a first threshold value when the movement state of the user of the device in the first time period is a stop state and may be determined as a second threshold value when the movement state of the user of the device in the first time period is not the stop state, in which the first threshold value is less than the second threshold value.

The controller may determine a place where the user is located based on the determined first movement state and second movement state.

The controller may acquire location information of the device from a position sensor included in the device upon determining the place where the user is located, and the display may display the acquired location information as location information of the determined place.

In accordance with another aspect of the present disclosure, a method of recognizing a user activity is provided. The method includes acquiring acceleration data of a device in a first time period and a second time period adjacent to the first time period from an accelerometer, determining a first movement state of a user of the device in the first time period based on the acceleration data corresponding to the first time period, and determining a second movement state of the user in the second time period in consideration of the acceleration data corresponding to the second time period and also the determined first movement state and displaying the first movement state and the second movement state.

Each of the movement states may indicate one of a plurality of predetermined movement activities of the user, and the plurality of movement activities may include at least one of a stationary activity, a stop activity, a walking activity, a jogging activity, a cycling activity, and a driving activity.

The determining of the first movement state of the user of the device in the first time period may include creating feature data for classifying the plurality of movement activities using the acceleration data corresponding to the first time period and determining the movement state of the user in the first time period based on the created data.

The determining of the second movement state of the user in the second time period in consideration of the acceleration data corresponding to the second time period and also the determined first movement state may include determining the second movement state based on a possibility of occurrence of each of the plurality of movement activities as a next movement state of the first movement state when the first movement state occurs in the first time period.

The determining of the second movement state of the user in the second time period in consideration of the acceleration data corresponding to the second time period and also the determined first movement state may include using the acceleration data corresponding to the second time period to create feature data for classifying the plurality of movement activities and determine a threshold value based on the first movement state and comparing the created feature data with the threshold value to determine the second movement state.

The feature data may be an average magnitude of the acceleration data, the comparing of the created feature data with the threshold value to determine the second movement state may include determining the movement state of the user in the second time period as a stationary state when the average magnitude of the acceleration data is less than the threshold value, and the threshold value may be determined as a first threshold value when the movement state of the user of the device in the first time period is a stop state and may be determined as a second threshold value when the movement state of the user of the device in the first time period is not the stop state, in which the first threshold value is less than the second threshold value.

The method may further include determining a place where the user is located based on the determined first movement state and second movement state.

The method may further include acquiring location information of the device from a position sensor included in the device upon determining the place where the user is located, and displaying the acquired location information as location information of the determined place.

In accordance with another aspect of the present disclosure, a device is provided. The device includes an accelerometer configured to measure an acceleration of the device, a controller configured to acquire acceleration data of the device from the accelerometer when a user of the device moves, determine a movement state of the user based on the acquired acceleration data, and determine a place where the user is located in a time period when the acceleration data is acquired based on the movement state of the user, a display configured to display the determined place as the place where the user is located in the time period when the acceleration data is acquired.

The controller may acquire location information of the device from a position sensor included in the device upon determining the place where the user is located in the time period when the acceleration data is acquired, and the display may display the acquired location information as location information of the determined place.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a flowchart for describing a method of a device determining a movement state of a user on the basis of a feature of a frame according to an embodiment of the present disclosure;

FIGS. 4B and 4C show threshold values for determining a movement state of a user according to an embodiment of the present disclosure;

FIG. 11 is a table showing a movement state of a user with respect to time according to an embodiment of the present disclosure;

Throughout the drawings, it should be noted that like reference numbers are used to depict the same or similar elements, features, and structures.

DETAILED DESCRIPTION

Figure 1:
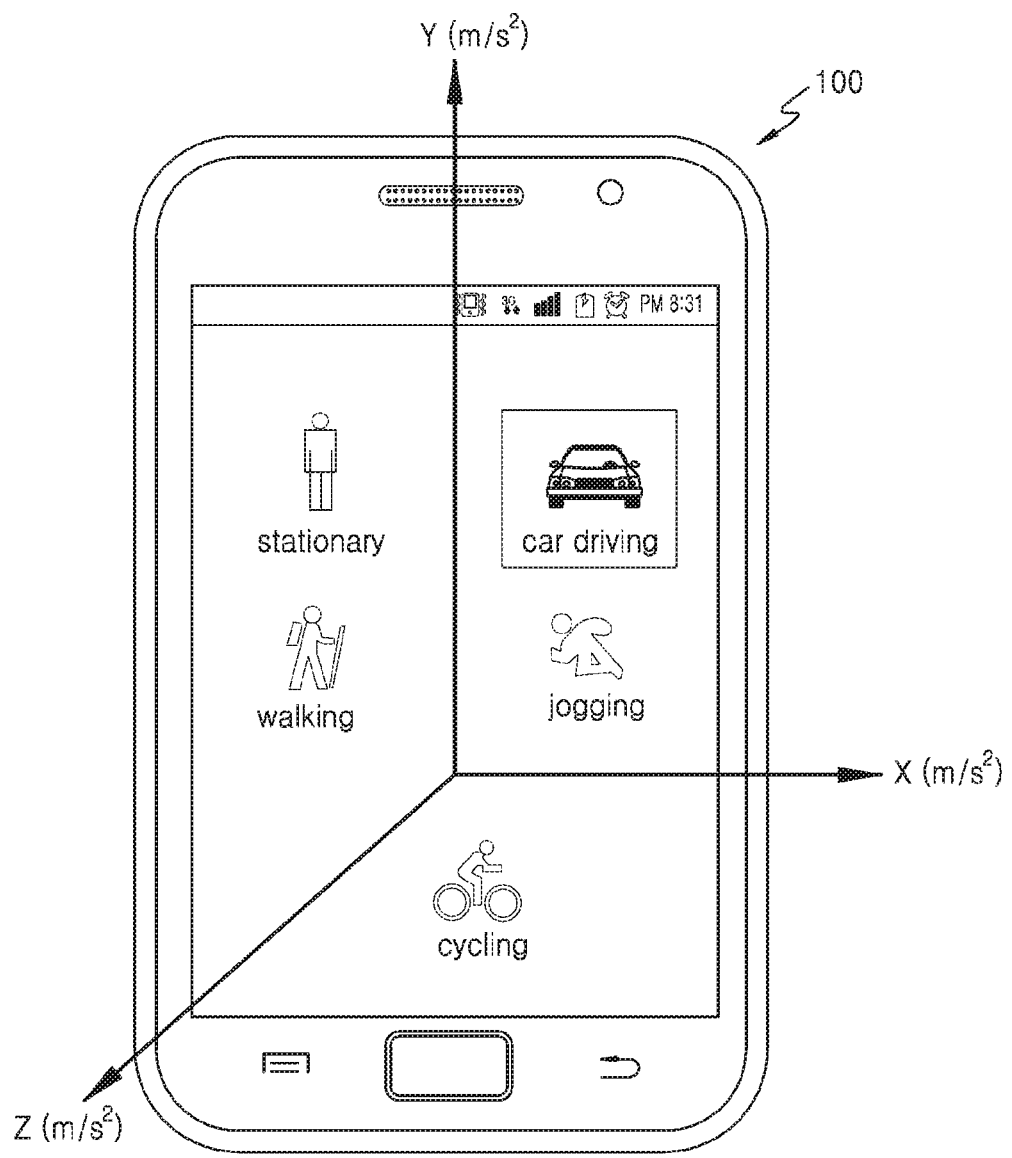
FIG. 1 is a diagram for describing a method of a device using acceleration information of the device to determine a movement state of a user according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and the various embodiments will be described in detail.

Terms used in the various embodiments have been selected as general terms which are widely used at present, in consideration of the functions of the various embodiments, but may be altered according to the intent of an operator skilled in the art, practice, or introduction of new technology. Also, if there is a term which is arbitrarily selected by the applicant in a specific case, in this case, a meaning of the term will be described in detail in a corresponding description portion of the various embodiments. Therefore, the terms should be defined on the basis of the entire content of this specification instead of a simple name of each of the terms.

In the disclosure below, when it is described that one comprises (or includes or has) some elements, it should be understood that it may comprise (or include or have) only those elements, or it may comprise (or include or have) other elements as well as those elements if there is no specific limitation. Moreover, each of terms such as "unit" and "module" described in the specification denotes an element for performing at least one function or operation, and may be implemented in hardware, software or the combination of hardware and software.

The term "user's movement state" used herein denotes one of a plurality of movement activities of a user. The plurality of movement activities of the user may include standing, walking, jogging, ascending or descending stairs, ascending or descending a slope, riding an elevator, cycling, driving, taking a bus, and taking a subway train, but are not limited thereto.

The term "user's movement pattern" used herein may include a place where a user is located over time, a movement order of places, a residence time in one place, an average movement start time, an average movement end time, an average movement time, and a transportation method of a user upon movement, but is not limited thereto. The transportation method may include walking, cycling, driving, taking a subway, and taking a bus, but is not limited thereto.

The term "stop state" used herein may denote a state in which a user is located in a car that is started but not driven.

For example, the stop state may be a state in which a car stops for a moment to wait for a traffic light to change.

The term "stationary state" used herein may denote a non-moving state while a car is not used to move. For example, the stationary state may be a state in which a user pauses while walking or cycling.

In the following detailed description, only certain embodiments of the present disclosure have been shown and described, simply by way of illustration. The various embodiments may, however, be embodied in many different forms and should not be construed as being limited to the various embodiments set forth herein. In the accompanying drawings, portions irrelevant to a description of the various embodiments will be omitted for clarity. Moreover, like reference numerals refer to like elements throughout.

FIG. 1 is a diagram for describing a method of a device 100 determining a movement state of a user using acceleration information of the device 100 according to an embodiment of the present disclosure.

Referring to FIG. 1, the device 100 may determine the movement state of the user using the acceleration information of the device 100. For example, as shown in FIG. 1, the device 100 may indicate that the user of the device 100 is in a driving state.

The movement state of the user may indicate one of a plurality of movement activities of the user. The plurality of movement activities of the user may include standing, walking, jogging, ascending or descending stairs, ascending or descending a slope, riding an elevator, riding a bicycle, riding in a car, taking a bus, and taking a subway train, but are not limited thereto.

A list of the plurality of movement activities may be stored in the device 100. Alternatively, the list of the plurality of movement activities may be received from an external server. Also, the list of the plurality of movement activities may be changed on the basis of an activity of the user.

The device 100 may acquire accelerometer values in X, Y, and Z directions of the device 100 using an accelerometer included in the device 100. The accelerometer values of the device 100 may indicate a certain pattern according to the movement state of the user. For example, when the user is standing, walking, or cycling, accelerometer values of the device 100, which moves with the user, with respect to time may show different patterns.

Thus, the device 100 may learn a pattern of acceleration data in advance according to the plurality of movement activities and may determine the movement state of the user on the basis of the learned pattern. In this case, the device 100 may learn the pattern of the acceleration data according to the plurality of movement activities in a machine learning method. The machine learning method may use a convolution neural network, a support vector machine, etc., but is not limited thereto.

Also, the device 100 may determine a movement state of the user with respect to time on the basis of the acceleration data acquired over time and may determine a place where the user is located at a time when the acceleration data is acquired on the basis of the movement state of the user with respect to time.

In addition, the device 100 may determine a life pattern of the user on the basis of the movement state of the user with respect to time. Also, the device 100 may determine a movement pattern of the user on the basis of the change in place of the user over time.

Figure 2A:
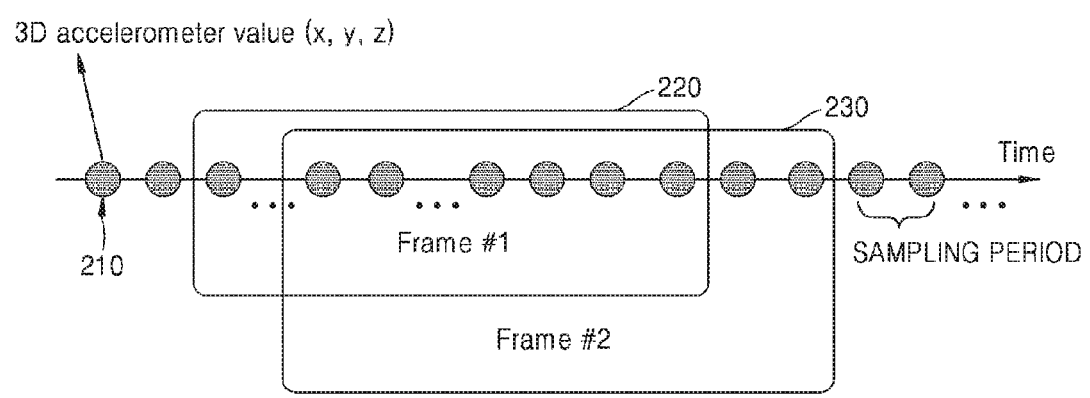
FIG. 2A is a diagram for describing a method of a device processing acceleration data of the device according to an embodiment of the present disclosure.

FIG. 2A is a diagram for describing a method of a device 100 processing acceleration data of the device 100 according to an embodiment of the present disclosure.

Referring to FIG. 2A, the device 100 may determine a movement state in one time period.

The device 100 may sample acceleration data of the device 100 at predetermined time intervals. For example, a sampling period may be 10 ms, 20 ms, or 50 ms, but is not limited thereto. In this case, when an acquisition time of a sample is not constant because of hardware characteristics of a sensor, the device 100 may apply interpolation to an acquired sample to estimate a value of a sample to be acquired in a sampling period.

The device 100 may acquire a plurality of pieces of data in orthogonal directions at one sampling time. For example, at one sampling time, the device 100 may acquire acceleration data in X, Y, and Z axes on the basis of one point in the device 100. In this specification, the acceleration data in the X, Y, and Z axes acquired at the one sampling time may be referred to as one sample 210 corresponding to the one sampling time.

The device 100 may determine a predetermined number of continuous samples as one frame. One frame may include 64, 128, or 256 samples, but is not limited thereto. The frame may denote samples acquired during one time period in which one movement state is extracted.

Also, neighboring frames may include the same samples. For example, when a first frame 220 includes 256 samples acquired continuously, a second frame 230 may include 129th to 256th samples, which is the second half of the 256 samples included in the first frame 220. By overlapping samples between the neighboring frames, the device 100 may use all of the acquired samples without omission, thus enhancing continuity of the movement state.

Figure 2B:
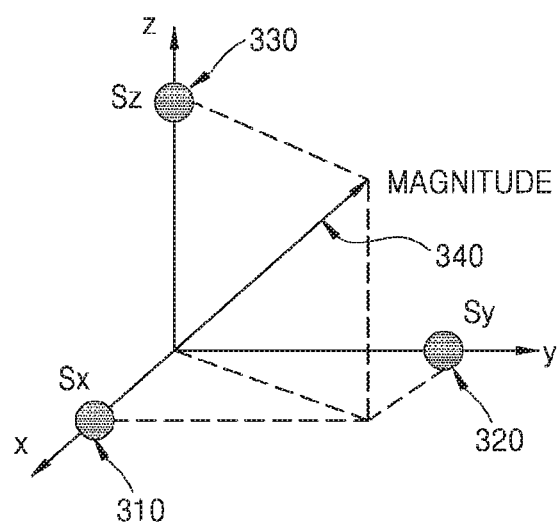
FIG. 2B is a diagram for describing a method of a device determining a vector formed by acceleration data according to an embodiment of the present disclosure.

FIG. 2B is a diagram for describing a method of a device 100 determining a vector formed by acceleration data according to an embodiment of the present disclosure.

Referring to FIG. 2B, the device 100 may determine the vector formed by the acceleration data in one sample.

A vector 340 corresponding to one sample may be a vector formed by x-axis data 310, y-axis data 320, and z-axis data 330.

The device 100 may determine the vector corresponding to the sample for each sample. Also, the device 100 may determine a movement state of a user on the basis of a feature of the vector. The feature of the vector may include the magnitude, frequency, standard deviation, or energy of the vector, but is not limited thereto.

Figure 3:
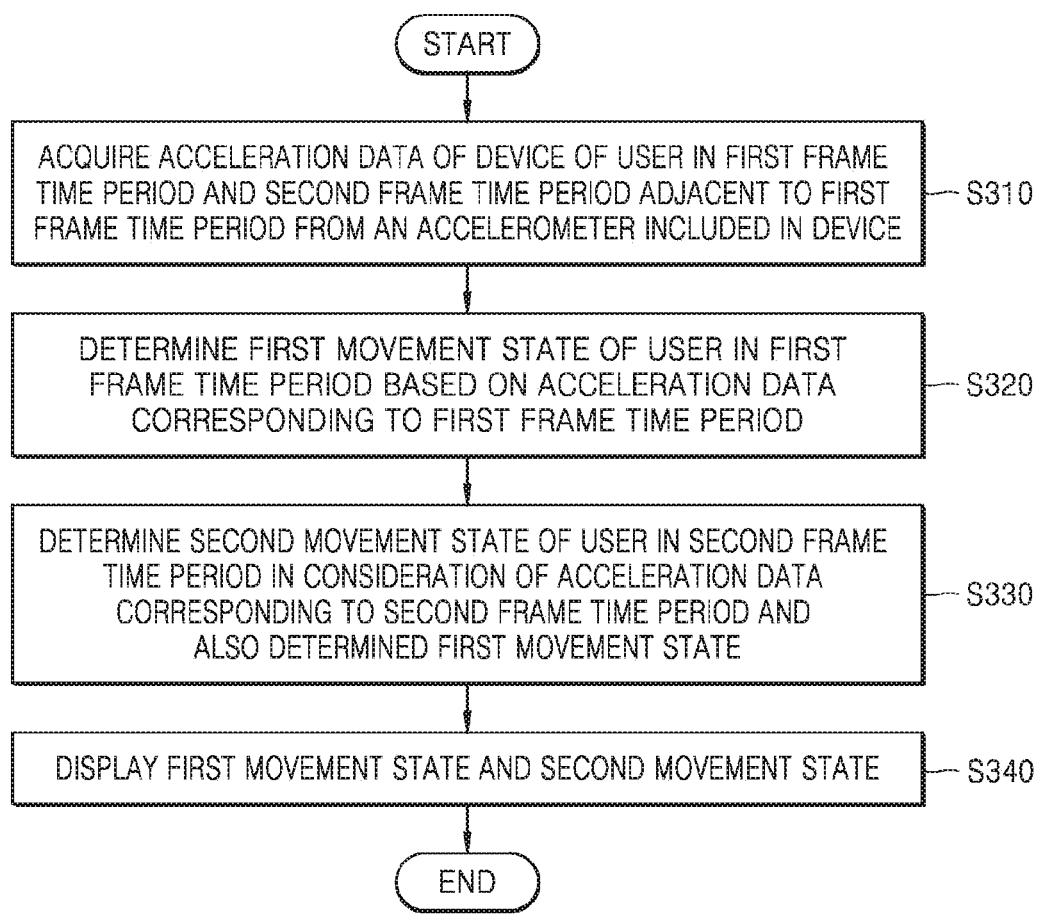
FIG. 3 is a flowchart illustrating a method of a device determining a current movement state in consideration of a previous movement state according to an embodiment of the present disclosure.

FIG. 3 is a flowchart illustrating a method of a device 100 determining a current movement state in consideration of a previous movement state according to an embodiment of the present disclosure.

In operation S310, a device 100 of a user may acquire acceleration data of the device 100 in a first frame time period and a second frame time period adjacent to the first frame time period from an accelerometer included in the device 100.

Here, the frame may denote samples acquired during one time period in which one movement state is extracted, and the frame time period may denote a time in which the frame is acquired.

A first frame time period and a second frame time period may overlap partially or may not overlap at all.

In operation S320, the device 100 may determine a first movement state of the user in the first frame time period on the basis of acceleration data corresponding to the first frame time period.

Acceleration data caused by a plurality of movement activities may be classified according to several features. For example, when the moving state of the user is a stationary state, the magnitude or energy indicated by the acceleration data may be the lowest among a plurality of movement activities. On the other hand, when the moving state of the user is a driving state, a frequency of a waveform indicated by the acceleration data may be the highest among the plurality of movement activities.

Thus, the device 100 may determine at least one of features for classifying the plurality of movement activities as a feature to be extracted from each frame and may extract the determined at least one feature from each frame. For example, the device 100 may convert a first frame into feature data indicating features of the first frame by convolving the first frame with a filter.

The device 100 may determine the movement state of the user in the first frame time period on the basis of the magnitude of the converted feature data. For example, when an average magnitude of the frame is equal to or greater than a first threshold value and less than a second threshold, and the frequency of the waveform of the frame is greater than a third threshold, the device 100 may determine the movement state of the user in the first frame time period as a stop state.

The threshold values of the feature data for determining the movement state may be predetermined and may be changed corresponding to the user's personal characteristics according to the movement activity of the user.

In operation S330, the device 100 may determine a second movement state of the user in the second frame time period in consideration of acceleration data corresponding to the second frame time period and also the determined first movement state.

When the current movement state is a jogging state, a jogging state, a walking state, and a stationary state may occur as a next movement state, but a driving state or a cycling state is unlikely to occur. Thus, among the plurality of movement activities, movement activities that may occur as the next movement state may be predetermined in the device 100 depending on the current movement state.

Thus, when the first movement state has occurred in the first time period, the device 100 may determine the second movement state on the basis of a possibility of occurrence of each of the plurality of movement activities as a next movement state of the first movement state. This will be described in detail with reference to FIGS. 6 to 7B.

Also, the second movement state may be determined in consideration of the first movement state by using the acceleration data corresponding to the second time period to create feature data for classifying the plurality of movement activities, determining a threshold value on the basis of the first movement state, and comparing the created feature data with the threshold value to determine the second movement state. This will be described in detail with reference to FIGS. 4A to 4D.

In operation S340, the device 100 may display the first movement state and the second movement state.

The device 100 may display the first movement state and the second movement state consecutively.

FIG. 4A is a flowchart for describing a method of a device 100 determining a movement state of a user on the basis of a feature of a frame according to an embodiment of the present disclosure.

In operation S410, a device 100 of a user may acquire acceleration data in X, Y, and Z directions during a first frame time from an accelerometer included in the device 100.

An example of acquiring the acceleration data in the X, Y, and Z directions during the first frame time may be described with reference to FIG. 2A.

In operation S420, the device 100 may determine a vector, which is formed by the acceleration data in the X, Y, and Z directions, corresponding to each sample in the first frame.

An example of determining the vector, which is formed by the acceleration data in the X, Y, and Z directions, corresponding to each sample in the first frame may be described with reference to FIG. 2B.

In operation S430, the device 100 may determine whether a frequency of the vector is equal to or greater than a frequency threshold value.

The device 100 may determine whether the movement state of the user is a stop state on the basis of the frequency of the vector and the magnitude of the vector.

FIGS. 4B and 4C show threshold values for determining a movement state of a user according to an embodiment of the present disclosure.

Referring to FIG. 4B, when the movement state of the user is the stop state, a frequency of a vector in one frame may be equal to or greater than the frequency threshold value. When the movement state is not the stop state, a frequency of a vector in one frame may be less than the frequency threshold value. The frequency threshold value may be, for example, 60 Hz, 70 Hz, or 100 Hz, but is not limited thereto.

When the frequency of the vector is less than the frequency threshold value in operation S430, the device 100 may determine whether an average magnitude of the vector is less than a first magnitude threshold value in operation S440.

Referring again to FIG. 4B, when the movement state of the user is the stop state, the average magnitude of the vector in one frame may be less than the first magnitude threshold value. The first magnitude threshold value may be, for example, 0.2 m/s$^2$ or 0.3 m/s$^2$, but is not limited thereto.

When the average magnitude of the vector in a first frame is less than the first magnitude threshold value in S440, the device 100 may determine that the movement state of the device 100 during the first frame time is the stop state in operation S450.

When the frequency of the vector is less than the frequency threshold value in operation S430, the device 100 may determine whether the average magnitude of the vector is less than a second magnitude threshold value in operation S460.

Referring again to FIG. 4B, when the movement state of the user is the stationary state, the frequency of the vector in one frame may be less than the frequency threshold value. Also, the average magnitude of the vector in one frame may be less than the second magnitude threshold value when the movement state of the user is the stationary state, and the average magnitude of the vector in one frame may not always be less than the second magnitude threshold value when the movement state of the user is not the stationary state.

In this case, the second magnitude threshold value may be changed depending on what is a movement state of a frame previous to the first frame. Referring to FIG. 4C, the second magnitude threshold value is T1 when the movement state of the previous frame is the stop state, and the second magnitude threshold value is T2 when the movement state of the previous frame is not the stop state. In this case, T1 may be less than T2.

In detail, the average magnitude of the vector in the stationary state may be less than the average magnitude of the vector in the stop state, but a difference between the average magnitude of the vector in the stationary state and the average magnitude of the vector in the stop state may be not great. Accordingly, although the movement state is the stop state, the movement may be easily determined as the stationary state.

Thus, the stop state may be determined as the stationary state when the average magnitude of the vector is very small. As shown in FIG. 4C, it is possible to clearly distinguish between the stationary state and the stop state by decreasing a magnitude threshold value for determining the stationary state when the movement state of the previous frame is the stop state below a magnitude threshold value for determining the stationary state when the movement state of the previous frame is not the stop state.

When the average magnitude of the vector is less than the second magnitude threshold value in operation S460, the device 100 may determine that the movement state of the device 100 during the first frame time is the stationary state in operation S470.

When the average magnitude of the vector is equal to or greater than the first magnitude threshold value in operation S440 or when the average magnitude of the vector is equal to or greater than the second magnitude threshold in operation S460, the device 100 may convert the first frame into feature data for classifying the plurality of movement activities in operation S480.

In operation S490, the device 100 may determine the movement state of the device 100 during the first frame time on the basis of the converted data.

An example associated with S480 and S490 will be described in detail with reference to FIGS. 5A, 5B, and 5C.

An example in which the movement state of the user is determined on the basis of the feature of the vector according to each sample has been disclosed in FIG. 4. However, the device 100 may determine the movement state of the user on the basis of a feature of at least one of x-axis data, y-axis data, and z-axis data instead of the feature of the vector. For example, the device 100 may determine the movement state of the user on the basis of a frequency or an average magnitude of data in an axis having the smallest standard deviation among the x-axis data, the y-axis data, and the z-axis data.

Figure 4D:
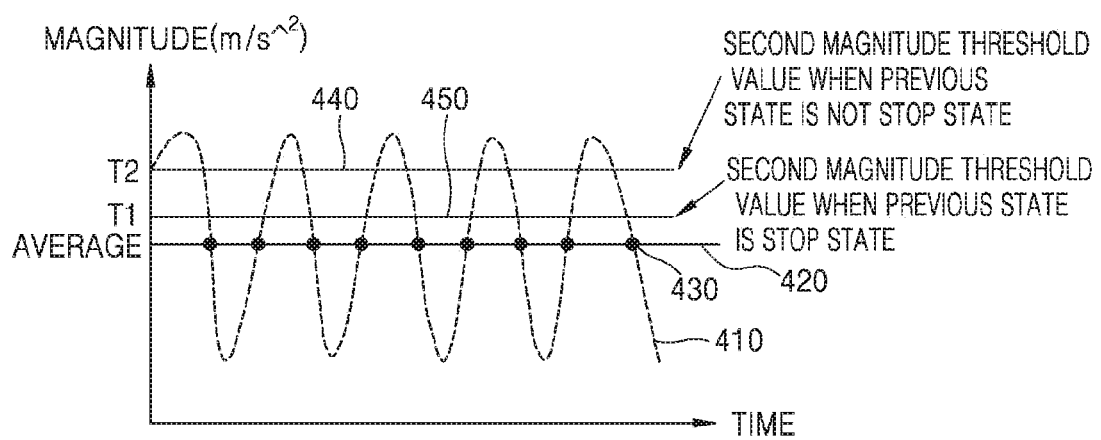
FIG. 4D is a diagram for describing a method of a device determining a movement state of a user on the basis of a feature of a vector formed by an acceleration data according to an embodiment of the present disclosure.

FIG. 4D is a diagram for describing a method of a device 100 determining a movement state of a user on the basis of a feature of a vector formed by an acceleration data according to an embodiment of the present disclosure.

Referring to FIG. 4D, the device 100 may distinguish between a stationary state and a stop state, which are movement states of the user, on the basis of an average magnitude and a frequency of a vector in one frame.

A waveform 410 shown in FIG. 4D may be a waveform in which magnitude of a vector in one frame is shown over time.

The device 100 may calculate an average magnitude 420 of the vector in one frame. Also, the device 100 may calculate a frequency of the vector on the basis of the number of intersection points 430 at which the average magnitude 420 of the vector in one frame intersects the magnitude waveform 410.

When the number of intersection points 430 in the frame is equal to or greater than a threshold number, and the average magnitude 420 of the vector is less than the first magnitude threshold value, the device 100 may determine the movement state of the user during the frame period as the stop state.

On the other hand, when the number of intersection points 430 in the frame is less than the threshold number, and the average magnitude 420 of the vector is less than the second magnitude threshold value, the device 100 may determine the movement state of the user during the frame period as the stationary state.

The second magnitude threshold value may be determined according to a movement state of a previous frame. As shown in FIG. 4D, a second magnitude threshold value 440 at a time when the movement state of the previous frame is not the stop state may be greater than a second magnitude threshold value 450 at a time when the movement state of the previous frame is the stop state.

Figure 5A:
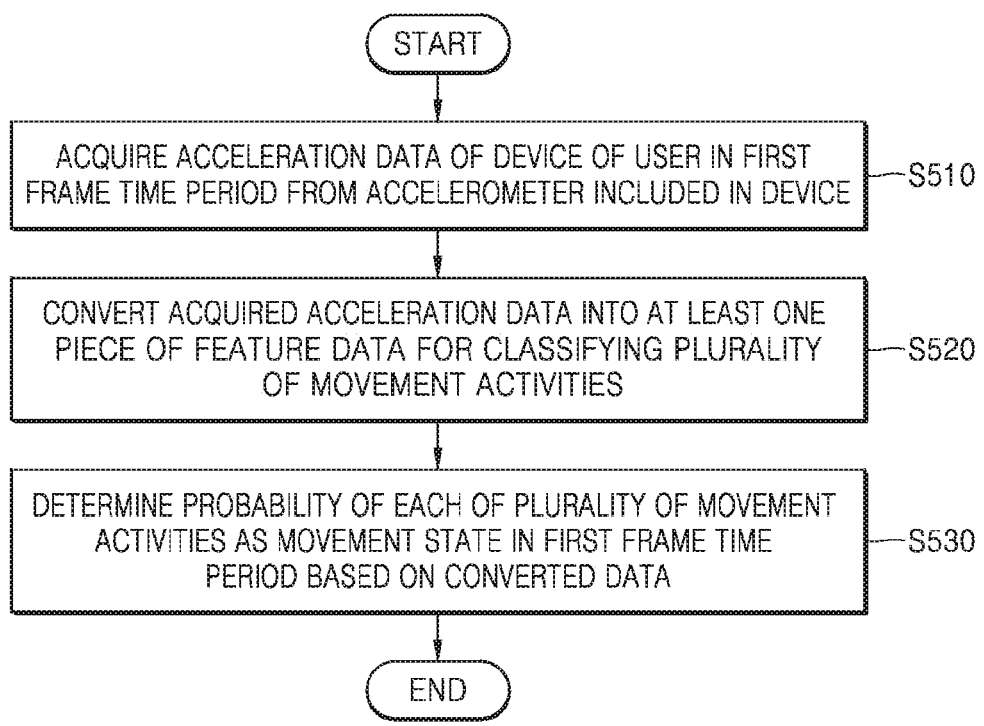
FIG. 5A is a flowchart for describing a method of a device determining one of a plurality of movement activities as a movement state of a user on the basis of a feature of acceleration data according to an embodiment of the present disclosure.

FIG. 5A is a flowchart for describing a method of a device 100 determining one of a plurality of movement activities as a movement state of a user on the basis of a feature of acceleration data according to an embodiment of the present disclosure.

In operation S510, a device 100 of a user may acquire acceleration data of the device 100 in a first frame time period from an accelerometer included in the device 100.

In operation S520, the device 100 may convert the acquired acceleration data into at least one piece of feature data for classifying the plurality of movement activities.

Features for classifying the plurality of movement activities may include a magnitude, average, standard deviation, energy, mobility, and complexity of the acceleration data. Furthermore, the features for classifying the plurality of movement activities may include a frequency of a waveform and a time distance between adjacent peaks of the waveform, which are indicated by the acceleration data, but are not limited thereto.

The features for classifying the plurality of movement activities may be calculated for each of an x-axis, a y-axis, and a z-axis or may be calculated for at least one of the x-axis, the y-axis, and the z-axis. For example, the device 100 may extract a feature from an axis having the smallest standard deviation among the x-axis, the y-axis, and the z-axis. In addition, the features for classifying the plurality of movement activities may be extracted from a vector formed by the x-axis data, the y-axis data, and the z-axis data.

The device 100 may determine at least one of the features for classifying the plurality of movement activities as a feature to be extracted from each frame and may extract the determined at least one feature from each frame. For example, the device 100 may convert a first frame into feature data indicating features of the first frame by convolving the first frame with a filter. The feature data may be, for example, a standard deviation value or an energy value of the first frame. The extracted at least one feature may be predetermined in the device 100 and may be changed corresponding to the user's personal characteristics according to the movement activity of the user.

In operation S530, the device 100 may determine a probability of each of the plurality of movement activities as the movement state in the first frame time period on the basis of the converted data.

The device 100 may determine the probability of each of the plurality of movement activities as the movement state in the first frame time period on the basis of the magnitude of the converted feature data.

The magnitude of the feature data extracted from the frame may be different depending on the movement activity. Accordingly, the device 100 may determine the probability of each of the plurality of movement activities as the movement state in the first frame time period on the basis of the magnitude of the feature data converted from the first frame.

Figure 5B:
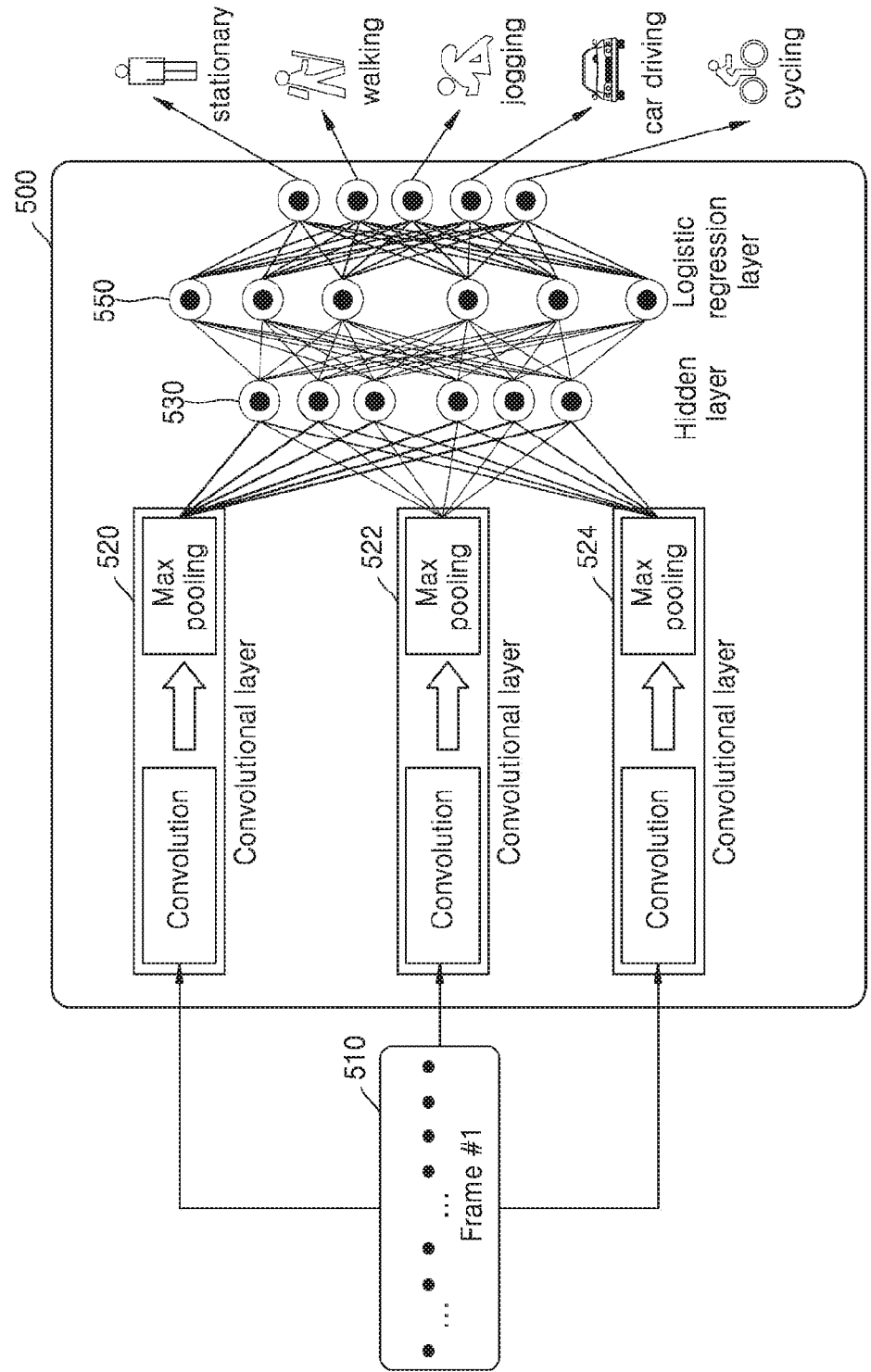
FIGS. 5B and 5C are diagrams for describing a method of a device determining one of a plurality of movement activities as a movement state of a user on the basis of a feature of acceleration data according to an embodiment of the present disclosure.
Figure 5C:
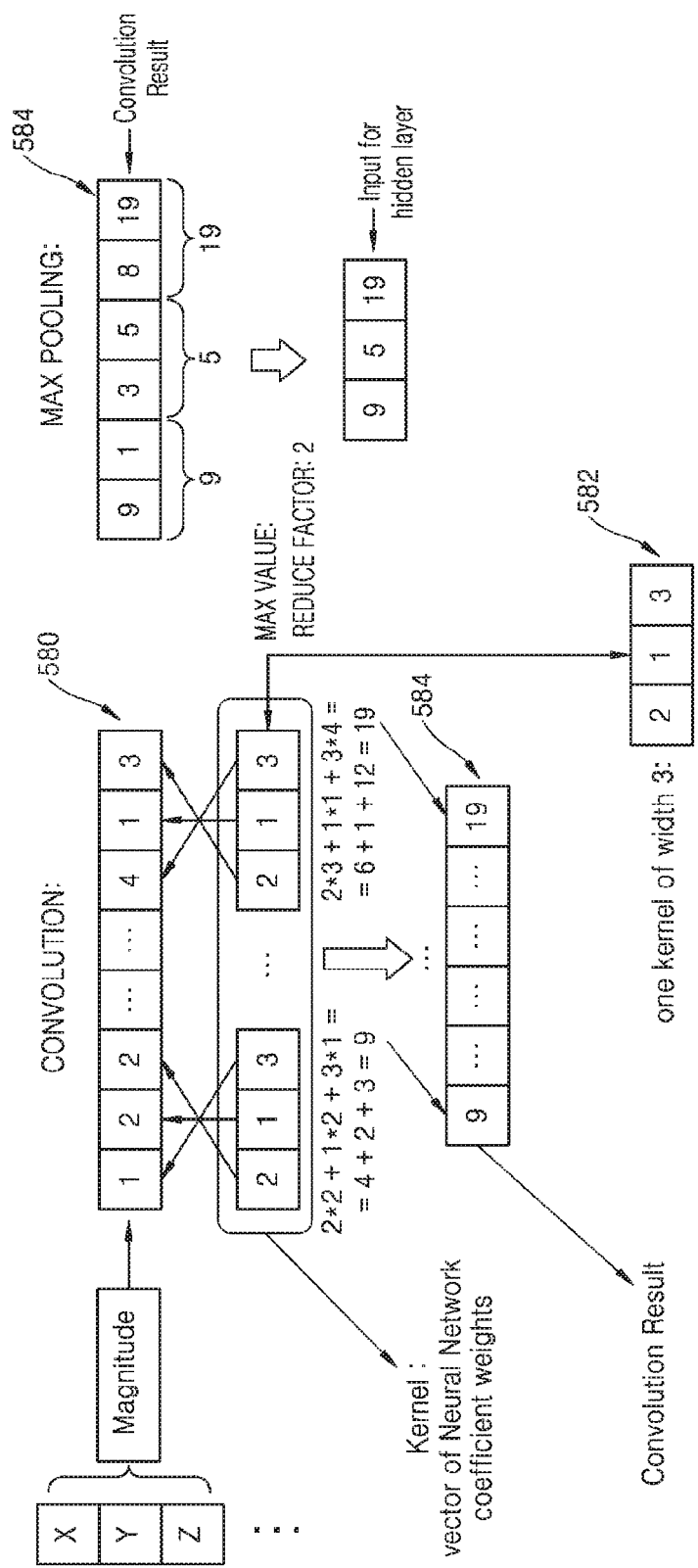

FIGS. 5B and 5C are diagrams for describing a method of a device 100 determining one of a plurality of movement activities as a movement state of a user on the basis of a feature of acceleration data according to an embodiment of the present disclosure.

Referring to FIG. 5B, the device 100 may use a predetermined convolution neural network 500 to determine the movement state of the user during a period of one frame 510.

The device 100 may extract at least one feature included in one frame 510 from one frame 510. The at least one feature may be a feature that is a criterion for classifying the plurality of movement activities.

The device 100 may extract at least one feature from one frame 510 through convolutional layers 520, 522, and 524.

For example, referring to FIG. 5C, the device 100 may convert one frame 510 into feature data 584 by convolving one frame 510 with a filter.

The device 100 may extract at least one feature on the basis of a size 580 of samples in one frame 510. The sample size may be magnitude of a vector formed by x-axis data, y-axis data, and z-axis data and may be magnitude of each of the x-axis data, the y-axis data, and the z-axis data.

Also, the device 100 may determine a filter 582 corresponding to each feature. The device 100 may receive a predetermined filter 582 corresponding to the feature from an external device 100 and may determine the filter 582 reflecting the user's personal characteristics through regression analysis on the basis of the acceleration data of the user device 100. Depending on the embodiment, the filter 582 may be referred to as a "kernel." The feature data 584 obtained by convolving one frame 510 with the filter may indicate the amount of a feature corresponding to the filter 582.

Also, the device 100 may reduce a dimension of the feature data 584. For example, when the feature data 584 is composed of six pieces of data, the device 100 may reduce the dimension of the feature data 584 by extracting the larger of two adjacent pieces of data.

Referring again to FIG. 5B, the device 100 may use a plurality of convolutional layers to extract a feature from one frame 510.

The period of the waveform of the movement of the user may be different depending on the movement activity. For example, the period of the waveform of the movement of the user is about 0.4 seconds in a driving state or a stationary state, about 0.8 seconds to about 1.6 seconds in a jogging state or a cycling state, and about 1.6 seconds in a walking state. Accordingly when sampling is performed at the same sampling rate, the number of samples that are sampled during one period of the frequency of the movement of the user may also be different depending on the movement activity of the user.

Thus, the device 100 may input one frame 510 to a plurality of convolutional layers having different configurations. For example, in a first convolutional layer 520, the number of convolutions may be 5, the length of a kernel of a convolution may be 21, the max pooling factor may be 4, and an activation function may be a hyperbolic tangent function, in order to detect the driving and the stationary state. In a second convolutional layer 522, the number of convolutions may be 10, the length of the kernel of the convolution may be 41, the max pooling factor may be 8, and an activation function may be a hyperbolic tangent function, in order to detect the jogging state and the cycling state. In a third convolutional layer 524, the number of convolutions may be 10, the length of the kernel of the convolution may be 41, the max pooling factor may be 8, and an activation function may be a hyperbolic tangent function, in order to detect the jogging state, the cycling state, the walking state. The number of convolutions may denote the number of input frames.

Feature data output from the convolution layers may be input to a hidden layer 530. The hidden layer 530 may normalize data regarding features. In addition, data output from the hidden layer 530 may be input to a logistic regression layer 550. The logistic regression layer 550 may integrate the data output from the hidden layer 530.

The data output from the logistic regression layer may be a probability of each of the movement activities as the movement state of the user in a period of the frame 510. For example, the device 100 may determine a probability that the movement state of the user in the period of the frame 510 will be the stationary state as 0.12, a probability that the movement state will be the walking state as 0.34, a probability that the movement state will be the jogging state as 0.65, a probability that the movement state will be the driving state as 0.18, and a probability that the movement state will be the cycling state as 0.79.

Figure 6:
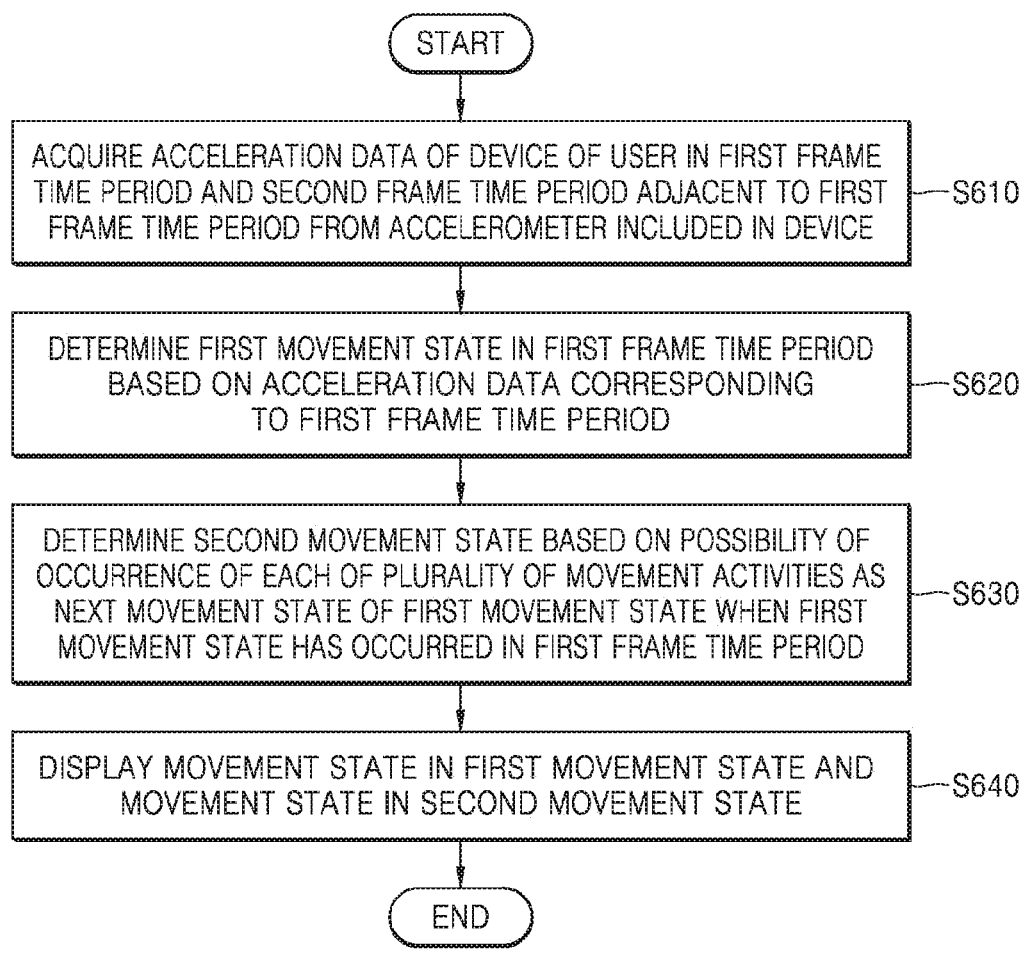
FIG. 6 is a flowchart illustrating a method of a device determining a current movement state in consideration of a previous movement state according to an embodiment of the present disclosure.

FIG. 6 is a flowchart illustrating a method of a device 100 determining a current movement state in consideration of a previous movement state according to an embodiment of the present disclosure.

In operation S610, a device 100 of a user may acquire acceleration data of the device 100 in a first frame time period and a second frame time period adjacent to the first frame time period from an accelerometer included in the device 100.

In operation S620, the device 100 may determine a first movement state of the user in the first frame time period on the basis of acceleration data corresponding to the first frame time period.

In operation S630, when the first movement state has occurred in the first frame time period, the device 100 may determine the second movement state on the basis of a possibility of occurrence of each of the plurality of movement activities as a next movement state of the first movement state.

When the current movement state is a jogging state, a jogging state, a walking state, and a stationary state may occur as the next movement state, but a driving state or a cycling state are unlikely to occur. Thus, among the plurality of movement activities, movement activities that may occur as the next movement state may be predetermined in the device 100 depending on the current movement state.

The probability of occurrence of the next movement activity based on the current movement activity may be changed depending on a duration of one frame or a time interval between adjacent frames.

Thus, when the first movement state has occurred in the first time period, the device 100 may determine the second movement state on the basis of a possibility of occurrence of each of the plurality of movement activities as a next movement state of the first movement state.

For example, the device 100 may determine a probability of each of the plurality of movement activities as the movement state in the second frame time period on the basis of acceleration data corresponding to the second frame time period. The device 100 may determine a movement activity having the highest probability among the plurality of movement activities as the second movement state in the second frame time period. In this case, when the second movement state cannot occur as the next movement state of the first movement state, the device 100 may redetermine a movement activity having the second highest probability among the plurality of movement activities as the second movement state in the second frame time period.

In operation S640, the device 100 may display the first movement state and the second movement state.

Figure 7A:
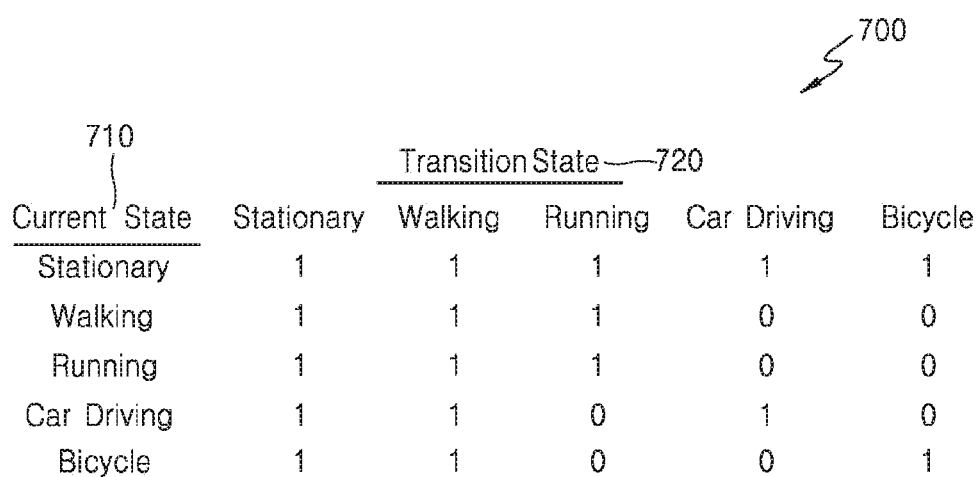
FIG. 7A is a table showing a possibility of occurrence of a next movement state on the basis of a current movement state according to an embodiment of the present disclosure.

FIG. 7A is a table 700 showing a possibility of occurrence as a next movement state (referred to as a transition state in this table) on the basis of a current movement state according to an embodiment of the present disclosure.

Referring to FIG. 7A, the device 100 may store a relationship between the current movement state 710 and the next movement state 720 in the form of a matrix.

The device 100 may determine the next movement state 720 on the basis of the current movement state 710. For example, when the current movement state is a stationary state, the device 100 may select all movement activities as the next movement state. However, when the current movement state is a walking state, the device 100 may not select a driving state or a cycling state (referred to as a bicycle in this table) as the next movement state.

Figure 7B:
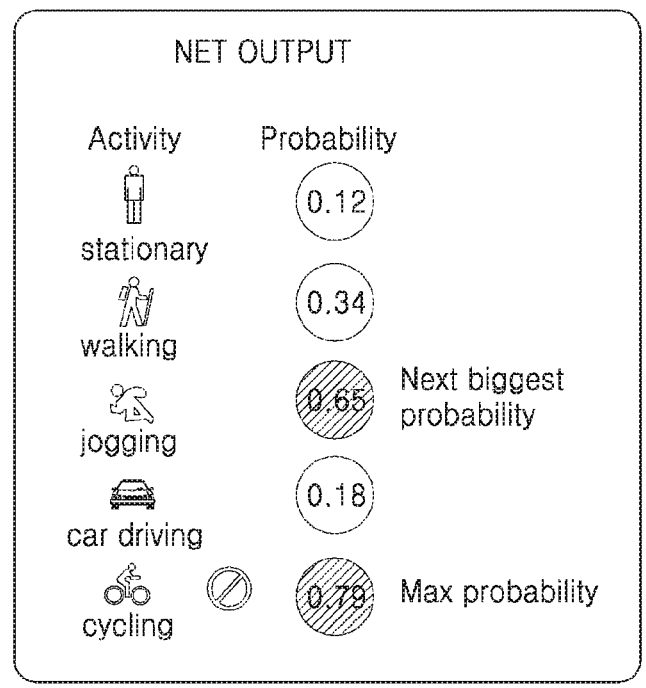
FIG. 7B is a diagram for describing a method of a device determining a current movement state on the basis of a previous movement state according to an embodiment of the present disclosure.

FIG. 7B is a diagram for describing a method of a device 100 determining a current movement state on the basis of a previous movement state according to an embodiment of the present disclosure.

Referring to FIG. 7B, the device 100 may determine the current movement state on the basis of a possibility of occurrence of each of the plurality of movement activities on the basis of the previous movement state.

For example, the device 100 may calculate a probability of each of the plurality of movement activities as the movement state of the user in the frame time period on the basis of the acceleration data in one frame. For example, the device 100 may determine a probability of the stationary state as 12%, a probability of the walking state as 34%, a probability of the jogging state as 65%, a probability of the driving state as 18%, and a probability of the cycling as 79%. Thus, the device 100 may determine the cycling state having the highest probability as the movement state of the user in the current frame time period.

When the movement state of the user in the previous frame time period is the jogging state, the device 100 may determine that the cycling state cannot occur as the next movement state of the jogging state on the basis of information regarding the possibility of occurrence as the next movement state based on the current movement state.

In this case, the device 100 may determine the jogging state having the second highest probability among the determined probabilities for the plurality of movement activities as the movement state of the user in the current frame time period.

Figure 8:
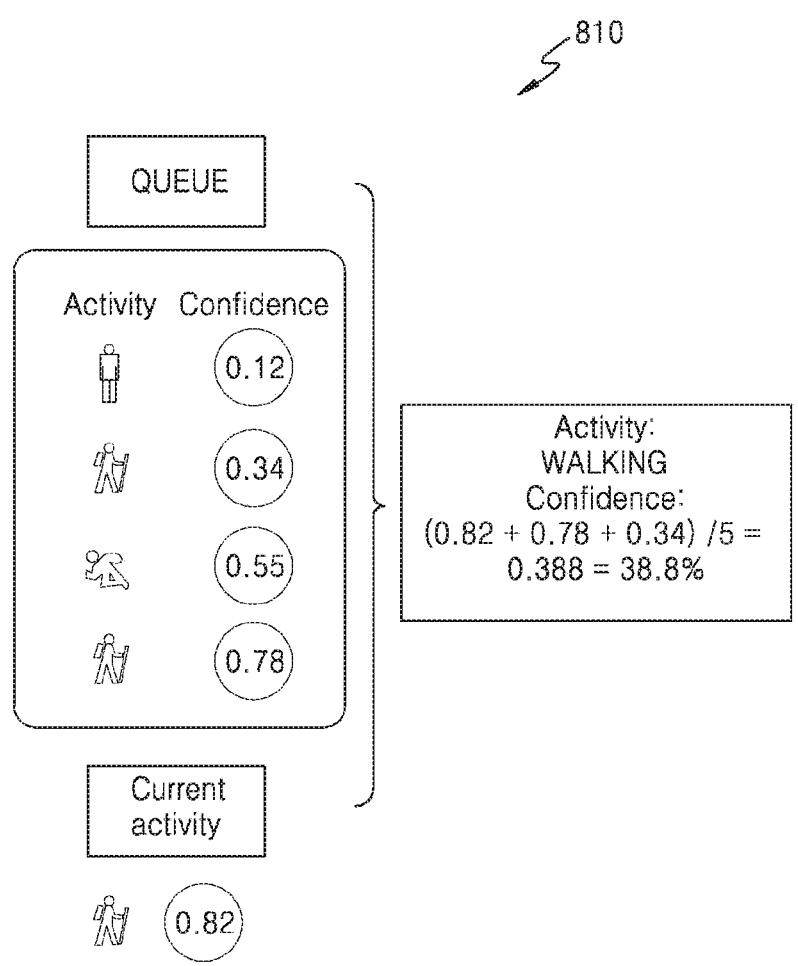
FIG. 8 is a diagram showing a method of a device determining the confidence of a current movement state on the basis of a previous movement state according to an embodiment of the present disclosure.

FIG. 8 is a diagram showing a method of a device 100 determining the confidence of a current movement state on the basis of a previous movement state according to an embodiment of the present disclosure.

Referring to FIG. 8, the device 100 may determine the confidence of the movement state of the current frame on the basis of a movement state of a previous frame and redetermine a current movement state on the basis of the determined confidence.

The device 100 may determine the confidence of the movement state of the current frame on the basis of confidence of movement states of the previous frame. For example, the device 100 may acquire four movement states 810 extracted from the previous four frames. In addition, the device 100 may acquire the confidence of the movement state that is the same as the current movement state among four movement states 800.

As shown in FIG. 8, when the movement states of the previous four frames are determined as a stationary state, a walking state, a jogging state, and a walking state, and the movement state of the current frame is determined as the walk state, the device 100 may determine the confidence of the movement state of the current frame by adding the confidence of the walking state among the previous four frames and the probability of the movement state of the current frame together and then dividing the total by the number of movement states.

When the confidence is equal to or less than a reference value, the device 100 may redetermine the determined movement state of the current frame.

Figure 9:
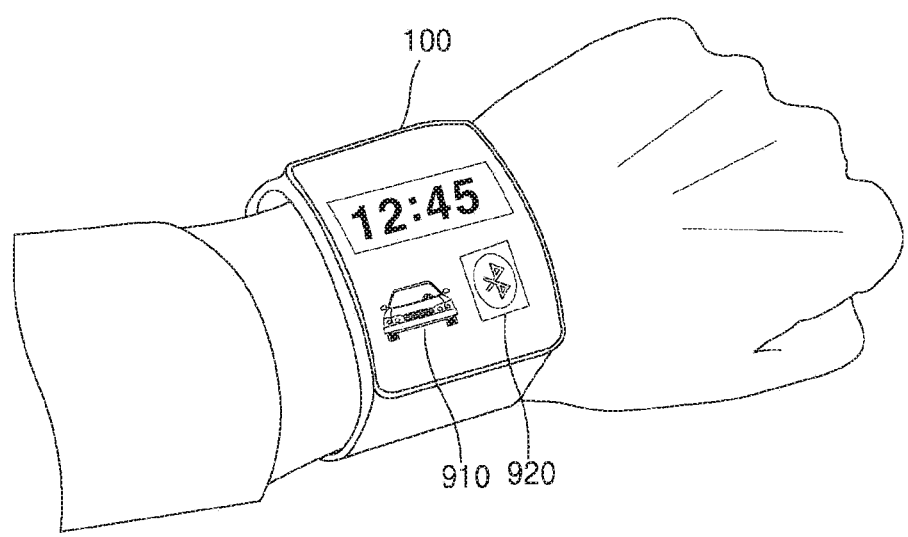
FIG. 9 is a diagram showing a method of a device providing a service associated with a movement state on the basis of a movement state of a user according to an embodiment of the present disclosure.

FIG. 9 is a diagram showing a method of a device 100 providing a service associated with a movement state of a user on the basis of the movement state according to an embodiment of the present disclosure.

Referring to FIG. 9, the device 100 may provide the service associated with the movement state of the user according to the movement state.

For example, when the user is in a car currently being driven, the device 100 may determine that the movement state of the user is a driving state. In this case, the device 100 may distinguish between a state in which a user is driving a car and a state in which a user is riding in a car being driven. For example, when a short-range wireless communication (e.g., Bluetooth) channel is established between the device 100 and the car, the device 100 may determine the state in which the user is driving the car. On the other hand, when a short-range wireless communication (e.g., Bluetooth) channel is not established between the device 100 and the car, the device 100 may determine the state in which the user is riding in the car being driven.

When the movement state of the user is determined as a state in which the user is driving the car, the device 100 may enter the driving mode. In addition, when a voice call connection request is received in the driving mode, the device 100 may automatically transmit a response message. A function of the device 100 performed in the driving mode may be set by the user.

When the device 100 enters the driving mode, the device 100 may display an icon 910 indicating that the driving mode has been entered. In addition, when a short-distance communication connection is established with the car, the device 100 may display an icon 920 indicating that the short-distance communication connection has been established with the car.

Figure 10:
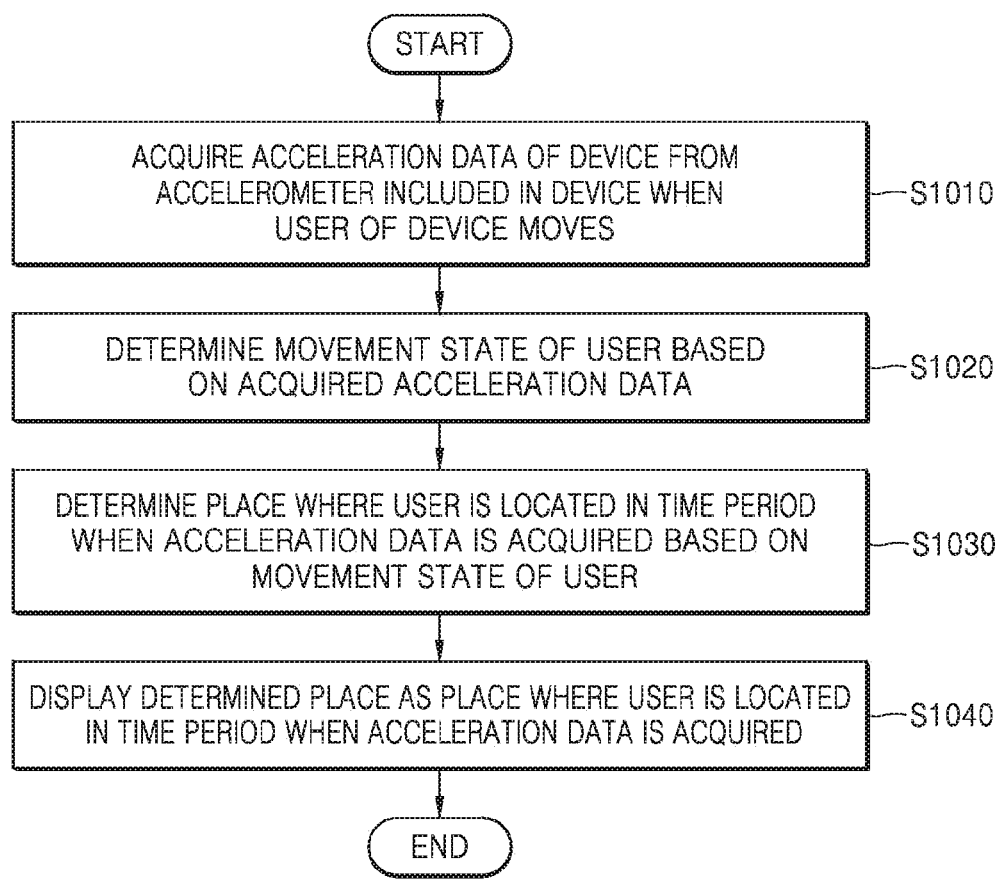
FIG. 10 is a flowchart showing a method of a device determining a place where a user is located on the basis of a movement state of the user according to an embodiment of the present disclosure.

FIG. 10 is a flowchart showing a method of a device 100 determining a place where a user is located on the basis of a movement state of the user according to an embodiment of the present disclosure.

In operation S1010, when a user of a device 100 moves, the device 100 may acquire acceleration data of the device 100 from an accelerometer included in the device 100. In operation S1020, the device 100 may determine a movement state of the user on the basis of the acquired acceleration data. Operation S1010 and S1020 may be described with reference to FIGS. 1 to 9.

In operation S1030, the device 100 may determine a place where the user is located in a time period when the acceleration data is acquired on the basis of the movement state of the user.

The place may include a transportation vehicle such as an automobile, a subway train, a bus, etc., in addition to a home, an office, an educational institute, a school, and a market.

A movement pattern of the user may be different for each place. For example, when the user is sleeping at home, the device 100 may determine the movement state of the user during a sleep time as a stationary state. Thus, the device 100 may determine the place where the user is located on the basis of the movement state of the user with respect to time.

Also, the device 100 may determine whether the user is moving. For example, when the movement state of the user is a driving state, a bus riding state, or subway riding state, the device 100 may determine that the user is moving.

In addition, the device 100 may determine the movement pattern of the user. For example, the device 100 may determine the place of the user, a time taken to move from the place to another, and a transportation method that changes over time. When the movement of the user is repeated, the device may determine the movement pattern of the user on the basis of the place of the user that has been determined during several days, weeks, or months. For example, the device 100 may determine a pattern of a commute time of the user and a transportation method usually used by the user during the commute time.

In addition, the device 100 may determine a place where the user visits often in addition to a home or office on the basis of the movement state of the user with respect to time. For example, when the stationary state lasts for a certain time or more, the device 100 may acquire location information of the device 100 using a position sensor. When the location information of the device 100 is acquired, the device 100 may determine whether the acquired location is a home or an office. When the same location is repeatedly acquired, the device 100 may determine the acquired location as the place where the user visits often, other than the home or office. In this case, only when the number of times the same location has been acquired for one week or month is equal to or greater than a reference number, the device 100 may determine the acquired location as the place where the user visits often.

Depending on the embodiment, the device 100 may transmit the movement state of the user to a server and may receive, from the server, information regarding a place of the user in a time period when the acceleration data is acquired. The server may receive the movement state of the user with respect to time from the device 100 and may determine the place where the user is located or the movement pattern on the basis of the received movement state of the user with respect to time. In addition, the server may provide the device with information regarding a service associated with the place where the user is located or the movement pattern.

In operation S1040, the device 100 may display the determined place as the place where the user is located in a time period when the acceleration data is acquired.

In addition, the device 100 may display the movement pattern of the user. Also, upon determining the place where the user is located, the device 100 may acquire location information of the device 100 from the position sensor included in the device 100 and may also display the acquired location information as location information of the place.

Upon determining the place where the user is located, the device 100 may display a confirmation window for confirming whether the determined location is a place where the user is currently located.

Also, upon determining the place where the user is located, the device 100 may provide a service associated with the place. Upon determining the place where the user is located as the user's home, the device 100 may provide a service associated with home. For example, the device 100 may automatically set a function or mode that is usually used by the user at home. Also, the device 100 may analyze a sleep time to inform the user of a time to go to bed in advance. Also, when the user wakes up, the device 100 may provide information on today's weather as an image or voice along with an alarm. When the user wakes up, the device 100 may inform the user of important daily tasks (e.g., a meeting, a trip, a birthday, an anniversary, and an appointment). On a condition that a 5-day vehicle rotation system is enforced, when the user wakes up, the device 100 may inform the user that the car cannot be driven depending on the day of the week.

Upon determining the place where the user is located as the user's office, the device 100 may provide a service associated with the office. For example, the device 100 may inform the user that a meeting is scheduled, in advance, before the meeting starts on the basis of a meeting time entered on a certain application of the device 100. Also, when the user usually performs vibration mode setting, Wi-Fi setting, or the like in the office, the device 100 may recognize a pattern in which the user sets the device 100 for each place. Upon determining that the user has entered the office, the device 100 may automatically set a function or mode that has usually been set by the user in the office.

In addition, the device 100 may provide a service associated with the movement pattern on the basis of the movement pattern of the user. For example, when the user starts the car to go to the office, the device 100 may recognize that the movement state of the user is changed from the stationary state to the car moving state and may determine that the user will drive the car to go to the office on the basis of the movement pattern of the user. Upon determining that the user will go to the office using the car, the device 100 may receive traffic conditions about a commute route that is usually used by the user from the server. When the traffic on the usually used commute route is heavy, the device 100 may provide the fastest route to arrive at the office on the basis of location information of the home and the office.

In addition, when the user is walking out of home to go to the office, the device 100 may recognize that the movement state of the user has been changed from the stationary state to the walking state and may determine that the user will go to the office on the basis of the movement pattern of the user. In this case, the device 100 may determine that the user usually takes a bus to go to and return from the office on the basis of the movement pattern of the user. Upon determining that the user will go to and return from the office by bus, the device 100 may receive information on today's weather from the server. When the today's weather is rainy, the device 100 may inform the user that it will rain.

FIG. 11 is a table 1100 showing a movement state of a user with respect to time according to an embodiment of the present disclosure.

Referring to FIG. 11, the device 100 may store a movement state 1120 with respect to time 1110 and a duration 1130 of the movement state 1120.

For example, when the stationary state lasts from 2015/03/21 11:33:33 PM to 2015/03/22 07:25:34 AM, the device 100 may store that the stationary state lasts for 7 hours 57 minutes 11 seconds from 2015/03/21 11:33:33 PM.

The device 100 may store the movement states of the user for the previous day, week, or month, from the current time. In addition, the device 100 may transmit a table 1100 showing the movement state of the user with respect to time to an external device 100 or server. Also, the device 100 may determine the place where the user is located and the movement pattern of the user on the basis of the table 1100 showing the movement state of the user with respect to time.

Figure 12A:
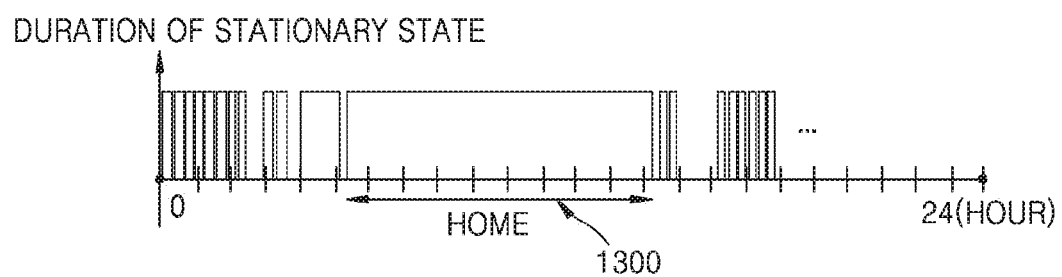
FIG. 12A is a diagram for describing a method of a device determining a place on the basis of a movement state of the user according to an embodiment of the present disclosure.

FIG. 12A is a diagram for describing a method of a device 100 determining a place on the basis of a movement state of the user according to an embodiment of the present disclosure.

Referring to FIG. 12A, the device 100 may determine the place on the basis of a duration of the movement state.

The device 100 may calculate a time for which the stationary state lasts on the basis of the table 1100 showing movement states of a user with respect to time. FIG. 12A may be a graph showing a time for which the stationary state lasts within one day according to an embodiment.

When the stationary state lasts for a reference time or more as the movement state of the user, the device 100 may determine that the user is located at home for a duration 1300 of the stationary state. The reference time may be 6 hours or more, but is not limited thereto.

In addition, the device 100 may determine the place of the user in consideration of a movement state and also a time at which the movement state occurs. For example, the device 100 may weight a time from 8:00 PM to 9:00 AM the next day while the stationary state lasts and may determine a time period having a high result value as a time for which the user is located at home.

In addition, depending on the embodiment, the device 100 may determine that the user is located at home for the duration 1300 of the stationary state in consideration of whether the user is located within a certain radius (e.g., 100 m) for a certain time (e.g., 5 hours) or more in addition to the movement state of the user, on the basis of a value of a position sensor (e.g., a global positioning system (GPS) sensor) included in the device 100.

Also, depending on the embodiment, the device 100 may determine that the user is located at home for the duration 1300 of the stationary state in consideration of a location where the user usually stays from 9:00 PM to 10:00 AM the next morning in addition to the movement state of the user.

Figure 12B:
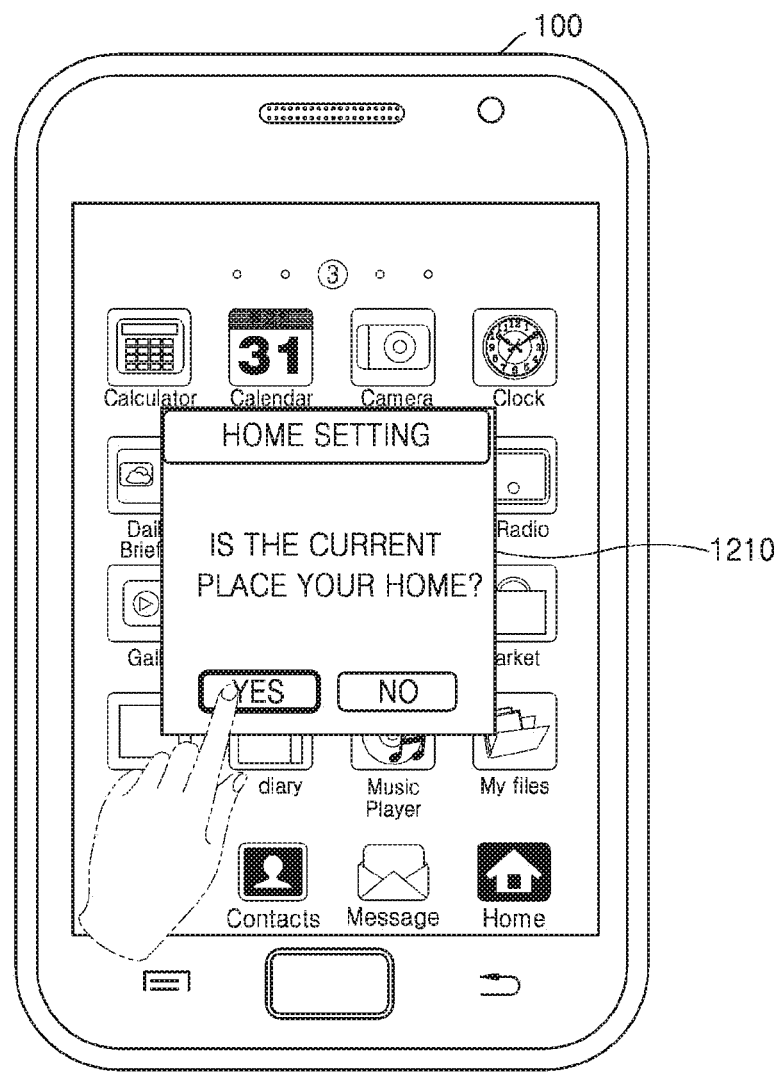
FIG. 12B is a diagram showing a method of a device determining a place of a user on the basis of confirmation of the user according to an embodiment of the present disclosure.

FIG. 12B is a diagram showing a method of a device 100 determining a place of a user on the basis of confirmation of the user according to an embodiment of the present disclosure.

Referring to FIG. 12B, the device 100 may determine the place on the basis of a movement state of the user and may display a user interface for receiving confirmation on the determined place from the user.

For example, when the stationary state lasts for a reference time or more, the device 100 may determine the current place of the user as the user's home. In this case, since the user's input has not been received for a long time, the device 100 may operate in a low-power mode (e.g., a sleep mode).

When the low-power mode of the device 100 is cancelled by manipulation of the user within a certain time in the stationary state or after the stationary state is changed into another movement state, the device 100 may display a confirmation window 1210 for confirming whether the current place is your home.

The device 100 may use the movement state of the user to determine the confidence of the determined place and store the confidence corresponding to the place on the basis of a user input entered through the confirmation window 1210.

Figure 12C:
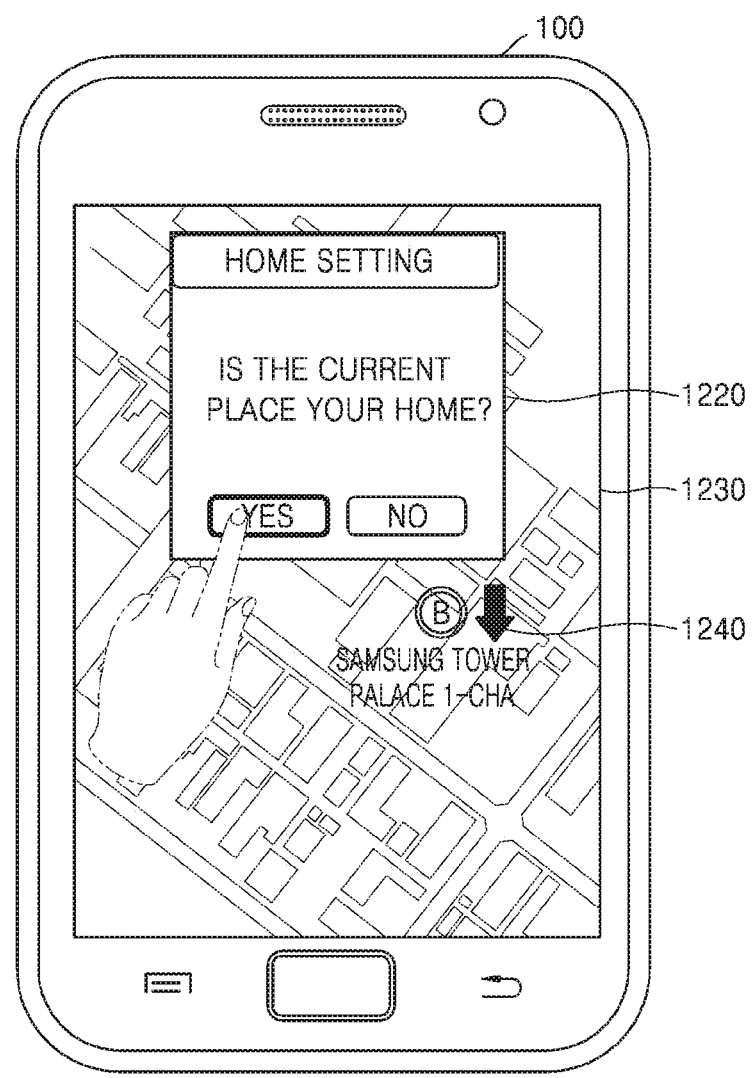
FIG. 12C is a diagram showing a method of a device determining a place of a user on the basis of confirmation of the user according to another embodiment of the present disclosure.

FIG. 12C is a diagram showing a method of a device 100 determining a place of a user on the basis of confirmation of the user according to another embodiment of the present disclosure.

Referring to FIG. 12C, the device 100 may determine the place on the basis of a movement state of the user and may display a user interface for receiving confirmation from the user along with location information of the determined place.

For example, when the stationary state lasts for a reference time or more, and thus the current place of the user is determined as the user's home, the device 100 may acquire the location information of the device 100 using the GPS included in the device 100. Upon acquiring the location of the device 100, the device 100 may request map information regarding the acquired location from a map server to receive the map information regarding the location of the device 100.

When the low-power mode of the device 100 is cancelled by manipulation of the user after the device 100 determines the current place of the user as the user's home, the device 100 may display a confirmation window 1220 for confirming whether a location acquired in the stationary state is a location of a house in which the user lives.

In this case, the device 100 may display a map 1230 showing the acquired location on the basis of the map information received from the map server. In addition, the device 100 may display an indicator 1240 indicating the user's home on the map 1230 on the basis of the location information acquired from the GPS.

The device 100 may use the movement state of the user to determine the confidence of the determined place and store the confidence corresponding to the place on the basis of a user input entered through the confirmation window 1220.

Figure 13:
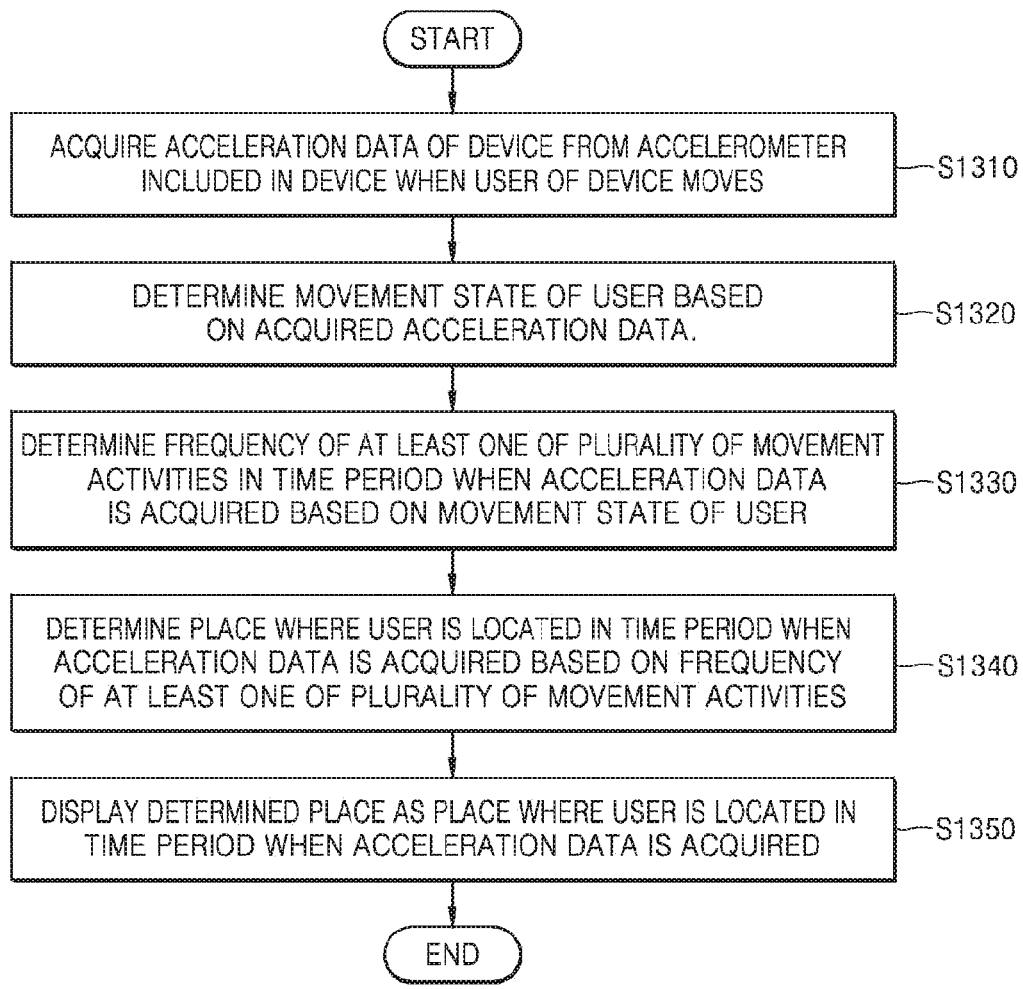
FIG. 13 is a flowchart showing a method of a device determining a location where a user is located on the basis of a movement state of the user according to an embodiment of the present disclosure.

FIG. 13 is a flowchart showing a method of a device 100 determining a place where a user is located on the basis of a movement state of the user according to an embodiment of the present disclosure.

In operation S1310, when a user of a device 100 moves, the device 100 may acquire acceleration data of the device 100 from an accelerometer included in the device 100. In operation S1320, the device 100 may determine a movement state of the user on the basis of the acquired acceleration data. Operation S1010 and S1020 may be described with reference to FIGS. 1 to 9.

In operation S1330, the device 100 may determine a frequency of at least one of a plurality of movement activities in a time period when the acceleration data is acquired on the basis of the movement state of the user.

The frequency of the at least one of the plurality of movement activities may denote the number of times the movement activity is determined as the movement state per unit of time. The unit time may be one minute or one hour, but is not limited thereto.

In operation S1340, the device 100 may determine a place where the user is located in a time period when the acceleration data is acquired on the basis of the frequency of the at least one of the plurality of the movement activities.

For example, when the user is shopping for groceries in a market, the user may repeatedly walk and stand at intervals of several seconds or minutes. When the movement state of the user is determined as a stationary state and a moving state alternately repeating at intervals of several seconds or minutes, the device 100 may determine that the place of the user is the market. In addition, for example, when the user is in the office, the user may walk for a break or meeting once every one to two hours. When the movement state of the user is determined as an alternately repeating one-to-two-hour stationary state and several-minute walking state, the device 100 may determine that the place of the user is the office.

In operation S1350, the device 100 may display the determined place as the place where the user is located in a time period when the acceleration data is acquired.

Figure 14:
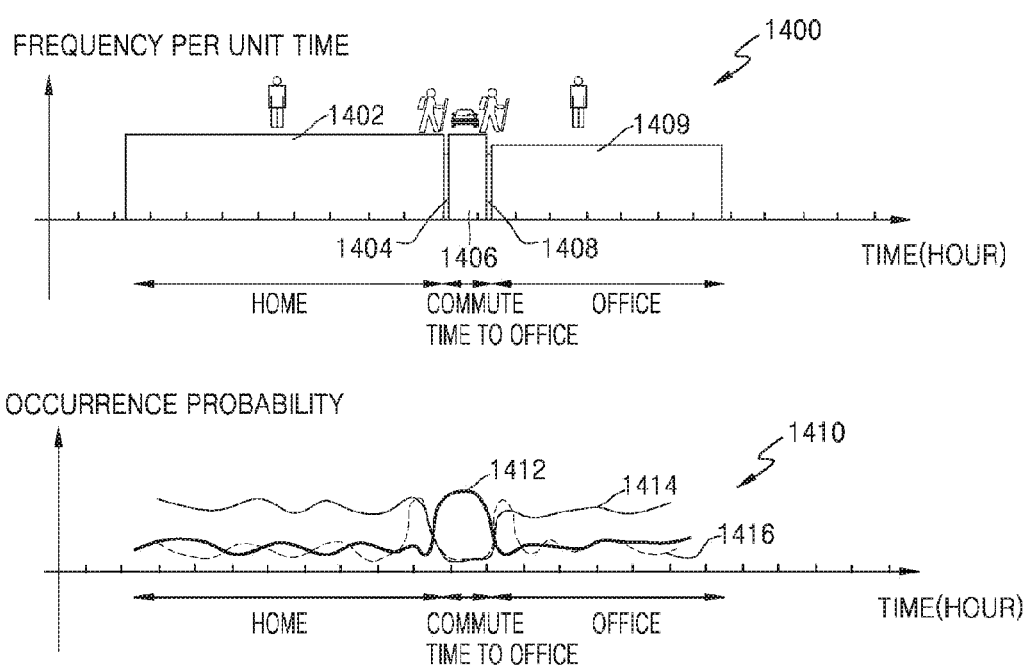
FIG. 14 is a diagram showing a method of a device determining a place where a user is located on the basis of a frequency at which each movement activity is determined as a movement state of the device according to an embodiment of the present disclosure.

FIG. 14 is a diagram showing a method of a device 100 determining a place where a user is located on the basis of a frequency at which each movement activity is determined as a movement state of the device 100 according to an embodiment of the present disclosure.

Referring to FIG. 14, the device 100 may determine the place where the user is located on the basis of the frequency at which at least one movement activity is determined as a movement state during a reference time.

Since there are many similarities among life patterns of users, a probability of occurrence of each of a plurality of movement activities over time may be determined to correspond to a common life pattern.

For example, when the user goes to work by car, the movement state of the user may be changed in the order of a first stationary state for six hours or more, a first walking state for about five minutes, a driving state for about one hour, a second walking state for about five minutes, and a second stationary state having a lower frequency than the first stationary state.

In addition, when the user goes to work by subway, the movement state of the user may be changed in the order of a first stationary state for six hours or more, a first walking state for about fifteen minutes, a subway riding state for about one hour, the second walking state for about fifteen minutes, and a second stationary state having a low frequency.

Common pattern information created on the basis of the common life pattern of users may be stored in the device 100. The common pattern information may be represented as a probability of occurrence of each of the movement activities over time.

The device 100 may calculate a frequency at which each movement activity is determined as the movement state for a unit time within one day. The device 100 may compare the frequency at which the movement activity is determined as the movement state for a unit time with the common pattern information to determine the change in the place of the user.

For example, as shown in a first graph 1400 of FIG. 14, the movement state of the user indicates a continuous stationary state in a first time period 1402, a walking state having a high frequency in a second time period 1404 and a fourth time period 1408, a driving state in a third period 1406, and a stationary state having a lower frequency than that in the first time period 1402, in a fifth time period 1409.

Thus, the device 100 may determine a pattern similar to the change in the movement state of the user from the common pattern information. For example, the device may determine that the change in the movement state shown in FIG. 14 is a commute pattern from home to the office, the user is located at home in the first time period 1402, the user is located at the office in the fifth time period 1409, and the user is going to work by driving a car in the third time period 1406.

In addition, the device 100 may calculate a probability of occurrence of each of the movement activities over time on the basis of the movement states of the user for several days. For example, as shown in the second graph 1410 of FIG. 14, the device 100 may calculate a probability 1414 that a stationary state will occur over time, a probability 1416 that a walking state will occur over time and a probability 1412 that a driving state will occur over time, on the basis of movement states of the user for several days. The device 100 may calculate a movement pattern of the user on the basis of the probability of occurrence of each of the movement states over time.

In addition, the device 100 according to an embodiment may determine the place where the user is located using a position sensor along with information regarding the movement states of the user. For example, when the movement state of the user is the stationary state that lasts for a certain time in the first time period 1402 and the third time period 1406, the device 100 may acquire location information of the device 100 using a position sensor of the device 100. In this case, only when a distance between a location in the first time period 1402 and a location in the third time period 1406 is equal to or greater than a reference distance, the device 100 may determine the location of the user in the first time period 1402 as the user's home and may determine the location of the user in the third period 1406 as the user's office.

Figure 15A:
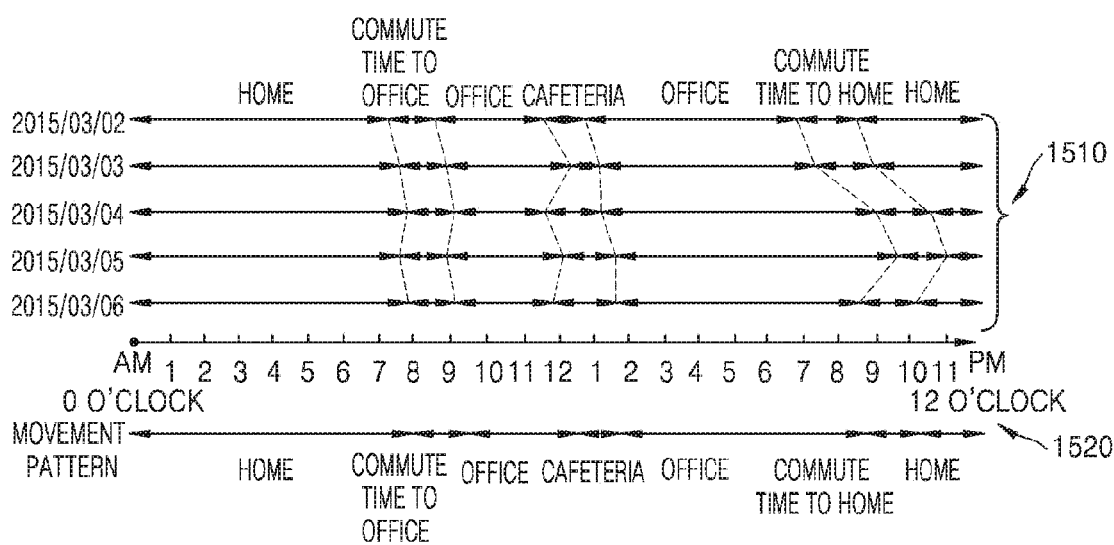
FIG. 15A is a diagram for describing a method of a device determining a life pattern of a user on the basis of a movement state of the user according to an embodiment of the present disclosure.

FIG. 15A is a diagram for describing a method of a device 100 determining a life pattern of a user on the basis of a movement state of the user according to an embodiment of the present disclosure.

Referring to FIG. 15A, the device 100 may determine the change in place of the user over time within one day on the basis of a movement state of the user and may determine a movement pattern of the user on the basis of the change in the place of the user for several days.

The device 100 may determine a change 1510 in the place over time for several days. For example, the device 100 may determine a change in the place of the user over time from Mar. 2 to 6, 2015, on the basis of the movement state of the user.

The device 100 may average the change in the place of the user for five days to determine a movement pattern 1520 of the user. For example, the device 100 may determine a time to go to work by averaging times of going from home to work for five days and may determine a time taken to go to work and an office arrival time by averaging times of arrival at the office for five days.

In this case, the device 100 may determine the movement pattern of the user separately depending on a weekday or weekend. In addition, the device 100 may determine a plurality of movement patterns as the weekday or weekend movement pattern of the user.

Figure 15B:
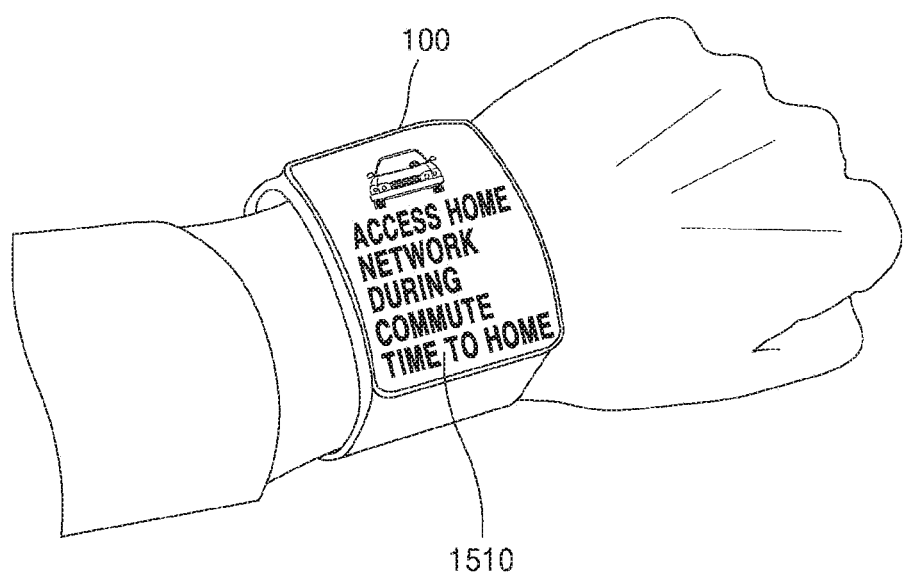
FIG. 15B is a diagram for describing a method of a device determining a movement objective and providing a service associated with the movement objective on the basis of a movement pattern of a user according to an embodiment of the present disclosure.

FIG. 15B is a diagram for describing a method of a device 100 determining a movement objective and providing a service associated with the movement objective on the basis of a movement pattern of a user according to an embodiment of the present disclosure.

Referring to FIG. 15B, the device 100 may determine the movement objective and provide the service associated with the determined movement objective on the basis of the movement pattern of the user.

For example, the device 100 may determine the movement state of the user as a driving state. Upon determining the movement state of the user as the driving state, the device 100 may determine the movement objective on the basis of the movement pattern of the user. For example, when the current time is 7:35 PM, and a place where the user is located, which is determined before a car is driven, is an office, the device 100 may determine that the objective of the driving is to move from the office to home on the basis of the movement pattern of the user that is determined in FIG. 15A.

Upon determining that the objective of the driving is to leave the office, the device 100 may display text 1510 indicating that the user is leaving the office.

In addition, the device 100 may provide a predetermined service associated with the leaving of the office. For example, the device 100 may establish a connection with a home network of a user and may control the device 100 inside the home according to an input of the user.

Upon determining the movement state of the user as the driving state and receiving a message, the device 100 may output the message with a voice. In addition, upon receiving a voice call connection request, the device 100 may reject the voice call connection request and automatically transmit a predetermined message to a caller depending on the importance of the caller.

Figure 16:
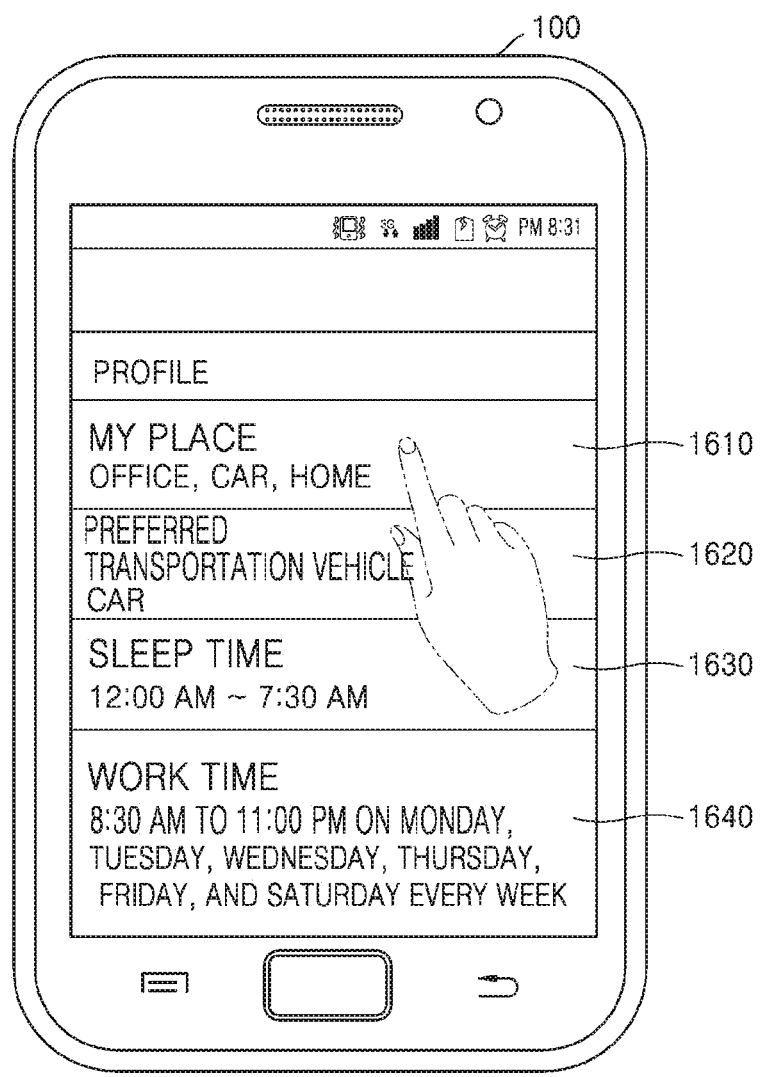
FIG. 16 is a diagram for describing a method of a device creating a profile of a user on the basis of a movement state of the user according to an embodiment of the present disclosure.

FIG. 16 is a diagram for describing a method of a device 100 creating a profile of a user on the basis of a movement state of the user according to an embodiment of the present disclosure.

Referring to FIG. 16, the device 100 may determine a movement pattern of the user on the basis of the movement state of the user and create the profile of the user based on the determined movement pattern.

The profile of the user may denote a life pattern of the user extracted from the movement pattern of the user. The device 100 may include, as the profile of the user, a place 1610 where the user is usually located, a preferred transportation vehicle 1620, a sleep time 1630, and a work time 1640, but is not limited thereto.

The device 100 may determine the place where the user is usually located on the basis of the movement pattern of the user. For example, the device 100 may determine a place where the user stays for a reference time or more within one day as the place where the user usually located on the basis of the movement pattern. For example, the place where the user is usually located may be a home, an office, and a car, but is not limited thereto.

In addition, the device 100 may determine a transportation vehicle preferred by the user on the basis of the movement pattern of the user. For example, the device 100 may determine a transportation vehicle that is most frequently used by the user for one month as the preferred transportation vehicle of the user on the basis of the movement pattern. The transportation vehicle may include an automobile, a subway train, and a bus, but is not limited thereto.

In addition, the device 100 may determine the sleep time of the user on the basis of the movement pattern of the user. For example, the device 100 may determine a time period in which a stationary state lasts for the longest time within one day on the basis of the movement pattern. In addition, depending on the embodiment, the device 100 may determine, as the sleep time of the user, a time for which the device 100 operates in a low-power mode while the stationary state lasts.

In addition, the device 100 may determine the work time of the user on the basis of the movement pattern of the user. For example, the device 100 may determine, as the work time of the user, a time after the user stops moving with a transportation vehicle and before the user starts to move with another transportation vehicle on the basis of the movement pattern. For example, the device 100 may determine, as the work time of the user, a time after the user arrives at the office and before the user leaves the office.

Figure 17:
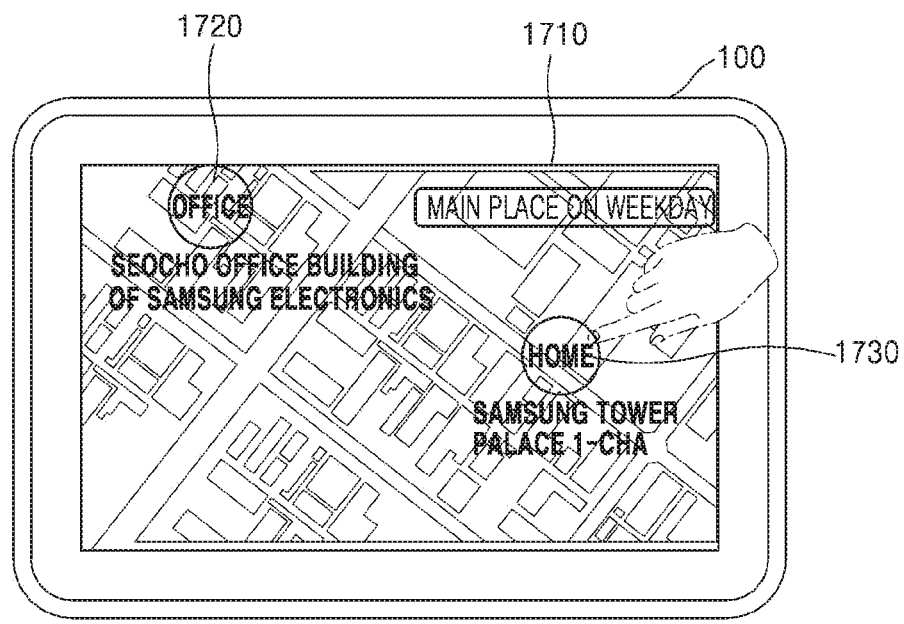
FIG. 17 is a diagram for describing a method of a device displaying a main place where a user is located according to an embodiment of the present disclosure.

FIG. 17 is a diagram for describing a method of a device 100 displaying a main place where a user is located according to an embodiment of the present disclosure.

Referring to FIG. 17, the device 100 may display the main place where the user is located.

For example, in FIG. 16, upon receiving a user input that selects "my place," the device 100 may display a location of an office and a location of a home on a map. In this case, the device 100 may separately display a main place where the user is located on a weekday and a main place where the user is located on a weekend.

In addition, the device 100 may change or generate the main place of the user on the basis of an input of the user. For example, the device 100 may receive a user input that changes a location of an icon 1730 indicating the location of home on the map. The device 100 may store the changed location of the icon as the location of the user's home. In addition, the device 100 may also receive a user input that sets another location as the main place of the user 1710 or an input that sets a third location as a work place 1720.

Figure 18:
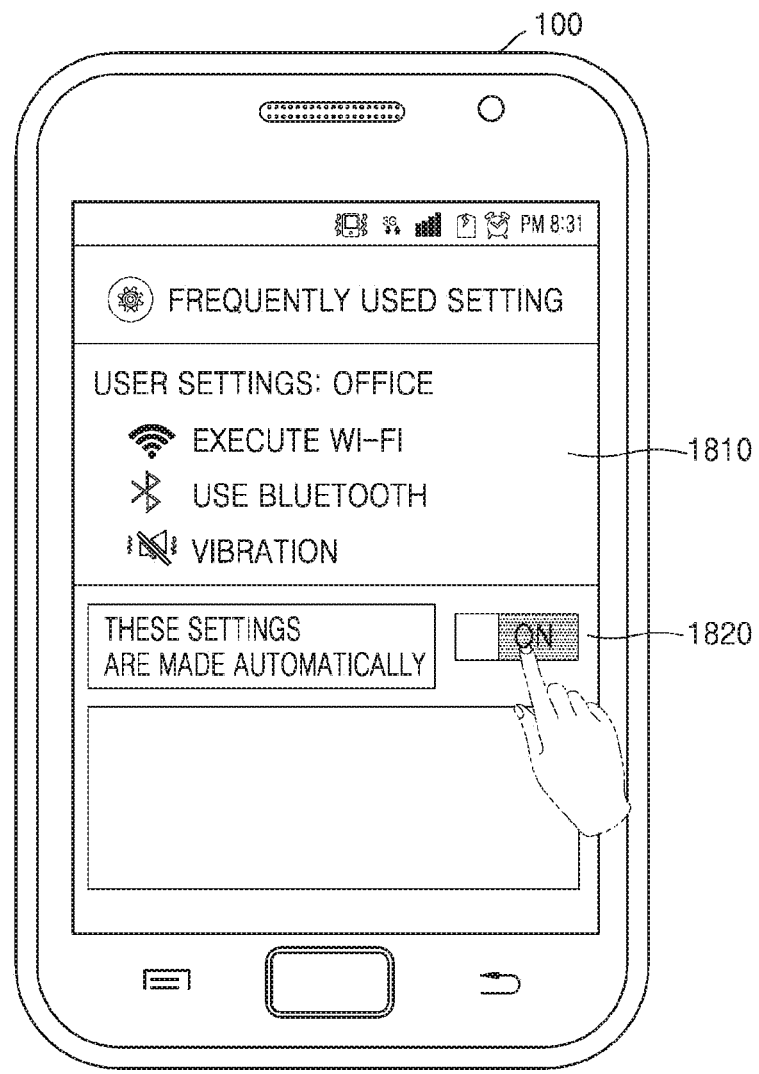
FIG. 18 is a diagram illustrating a method of a device setting a service to be automatically performed for each place according to an embodiment of the present disclosure.

FIG. 18 is a diagram illustrating a method of a device 100 setting a service to be automatically performed for each place according to an embodiment of the present disclosure.

Referring to FIG. 18, the device 100 may provide a user interface for setting the service to be automatically performed for each place.

Upon receiving a user input that selects a menu for setting a service to be automatically performed for each place, the device 100 may display functions or operation modes of the device 100 that are usually set for each place by the user. The functions or operation modes of the device 100 that are usually set for each place may be predetermined by the device 100 on the basis of the number of times the functions or operation modes are set for each place.

For example, a Wi-Fi connection, a Bluetooth connection, and a vibration mode setting may be stored in the device 100 as a function or operation mode that is usually set in the office. Thus, when the device 100 receives a user input that selects a menu for setting a service to be automatically performed for the office, the device 100 may display a list of functions or operation modes 1810 that are usually set in the office.

In addition, when the user enters a selected place, the device 100 may also display a button 1820 for selecting whether to automatically set functions or operation modes determined to correspond to a selected place when the user enters the selected place. Upon receiving a user input that selects an automatic setting, the device 100 may automatically set the functions or operation modes determined to correspond to the selected place when the user enters the place.

In addition, the device 100 may provide a user interface for adding a service to be automatically set when the user enters the selected place.

In addition, upon recognizing that the place of the user is the office and the user is in a meeting, when a voice call connection request is received, the device 100 may automatically reject the voice call connection request and transmit a predetermined message to a caller depending on the importance of the caller.

The device 100 may recognize that the user is in a meeting. For example, when the place of the user is the office, and the movement state of the user is changed from a walking state to a stationary state, the device 100 may drive a voice sensor (e.g., a microphone) included in the device 100 and acquire a voice in the vicinity of the device 100. The device 100 may analyze a pattern of the acquired voice and may determine that the user is in a meeting when the analyzed pattern is a pattern that may be generated in the meeting.

Figure 19:
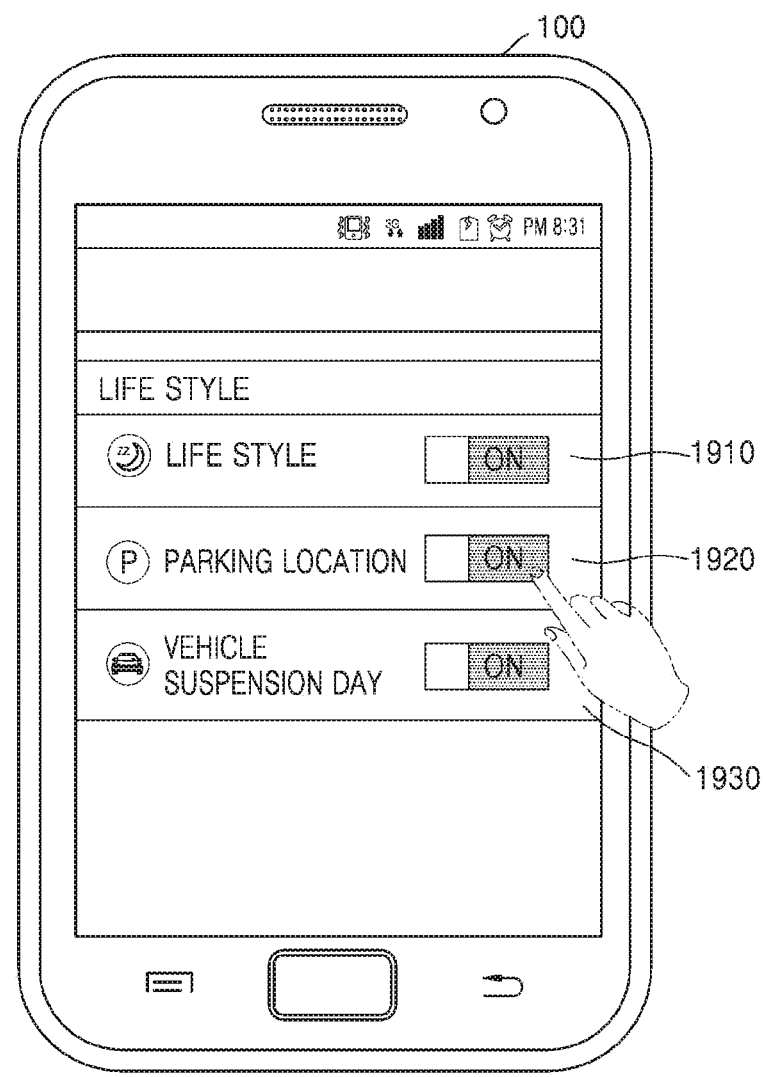
FIG. 19 shows a user interface for selecting information to be provided to a user from user information determined from a movement state of the user according to an embodiment of the present disclosure.

FIG. 19 shows a user interface for selecting information to be provided to a user from user information determined from a movement state of the user according to an embodiment of the present disclosure.

Referring to FIG. 19, the device 100 may provide a user interface for selecting information to be provided to a user from user information determined from a movement state of the user.

The user information that may be determined on the basis of the movement state may include information regarding a movement pattern, information regarding a transportation method, and information regarding a life pattern, but is not limited thereto.

The device 100 may display a button for selecting whether to provide the user information to the user in addition to a list of the user information that may be determined on the basis of the movement state of the user.

For example, the device 100 may display a button 1910 for selecting whether to determine information regarding a sleep time, a button 1920 for selecting whether to determine information regarding a parking location, and a button 1930 for selecting whether to determine a vehicle suspension day.

On the basis of a value selected to correspond to the user information, the device 100 may determine user information on the basis of the movement state of the user and may provide the determined information to the user.

Figure 20:
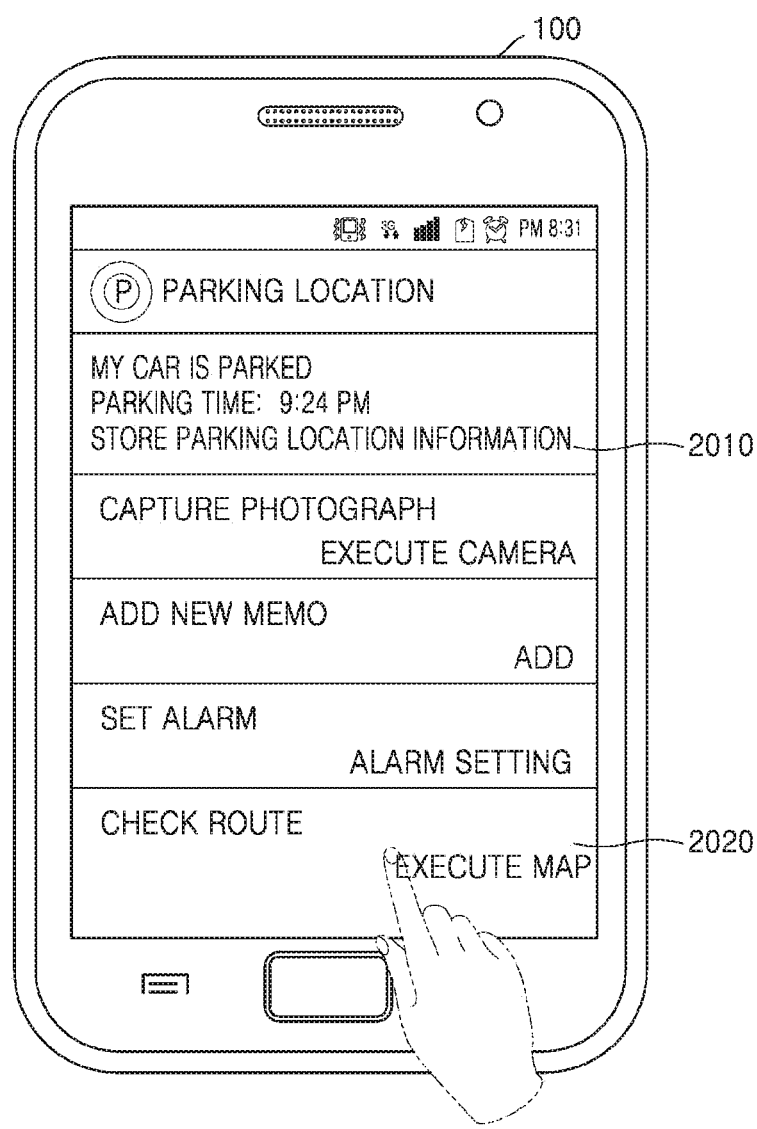
FIG. 20 is a diagram for describing a method of a device providing a parking location of a user according to an embodiment of the present disclosure.

FIG. 20 is a diagram for describing a method of a device 100 providing a parking location of a user according to an embodiment of the present disclosure.

Referring to FIG. 20, the device 100 may provide the parking location of the user to the user.

The device 100 may track the parking location of the user on the basis of a movement state of the user. For example, when the user parks and then walks, the movement state of the user may be changed from a driving state to a walking state. When the movement state of the user is changed from the driving state to the walking state, the device 100 may determine a situation in which the user parks his/her car and then walks.

Thus, the device 100 may determine, as a user parking time, a time at which the movement state of the user is changed from the driving state to the walking state or stationary state.

In addition, when the movement state of the user is changed from the driving state to the walking state or stationary state, the device 100 may display a menu for storing a parking time 2010 and a parking location. The menu for storing the parking location may include a menu for capturing a photograph, a menu for creating a memo, a menu for setting a notice, and a menu 2020 for checking a parking location.

Upon receiving a user input that selects the menu 2020 for confirming the parking location, the device 100 may store the movement state of the user from a parking time. In this case, the device may acquire direction data of the device 100 from a direction sensor (e.g., a compass) included in the device 100 while acquiring acceleration data from an accelerometer. In addition, from a time when the movement state of the user is changed from the driving state to the walking state, the device 100 may store the movement state of the user and the direction of device 100 with respect to time. Thus, the device 100 may create a path of the user leading away from the car on the basis of the movement state of the user and the direction of the device 100 with respect to time.

Depending on the embodiment, while creating the tracking path of the user from the parking location, the device 100 may receive a user input that sets a point at which the creation of the tracking path ends.

Upon receiving a user input that confirms the parking location of the user's car, the device 100 may provide the parking location of the user's car to the user by displaying the created tracking path.

In addition, depending on the embodiment, the device may store height data with respect to time using a height sensor (e.g., a pressure sensor) in addition to an accelerometer and a direction sensor. Thus, the device 100 may provide the parking location of the user by displaying a 3-dimensional tracking path that may also represent the change in height of the user.

Figure 21:
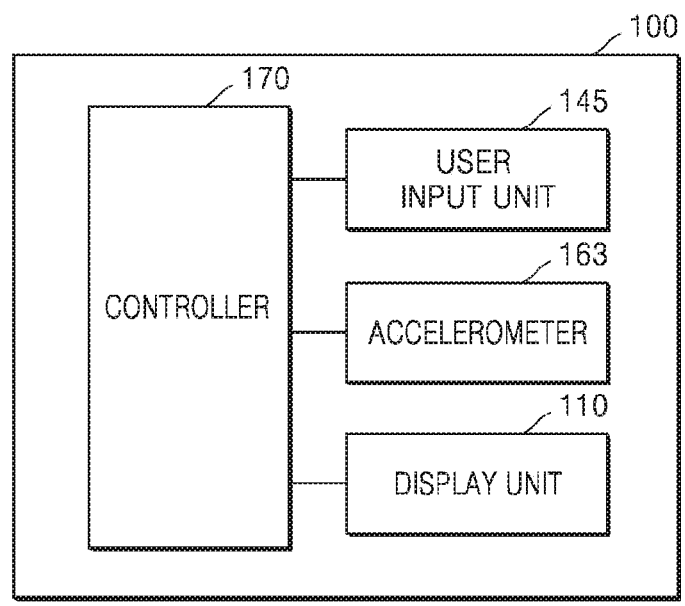
FIG. 21 shows a block diagram of a device according to an embodiment of the present disclosure.

FIG. 21 shows a block diagram of a device 100 according to an embodiment of the present disclosure.

Referring to FIG. 21, the device 100 according to an embodiment may include a user input unit 145, an accelerometer 163, a display unit 110, and a controller 170. However, not all elements shown in FIG. 21 are essential. The device 100 may be implemented with more elements than those shown in FIG. 21 and may be implemented with fewer elements than those shown in FIG. 21.

The accelerometer 163 may measure acceleration of the device 100. The accelerometer 163 may measure acceleration in an x-axis direction, a y-axis direction, and a z-axis direction of the device 100.

The controller 170 may acquire acceleration data of the device in a first time period and a second time period adjacent to the first time period from the accelerometer 163.

The second time period may partially overlap the first time period.

In addition, the controller 170 may determine a first movement state of the user in the first time period on the basis of acceleration data corresponding to the first time period.

For example, the controller 170 may create feature data for classifying the plurality of movement activities using the acceleration data corresponding to the first time period and may determine the movement state of the user in the first time period on the basis of the created data.

The movement state may indicate one of a plurality of movement activities of a predetermined user, and the plurality of movement activities may include a stationary activity, a stop activity, a walking activity, a jogging activity, a cycling activity, and a driving activity. In addition, the feature data for classifying the plurality of movement activities may be at least one of a magnitude, standard deviation, frequency, and energy of the acceleration data.

In addition, the controller 170 may determine a second movement state in the second time period in consideration of acceleration data corresponding to the second time period and also the determined first movement state.

For example, the controller 170 may determine the second movement state in consideration of the first movement state by determining the second movement state on the basis of a possibility of occurrence of each of the plurality of movement activities as a next movement state of the first movement state when the first movement state occurs in the first time period.

Also, for example, the controller 170 may determine the second movement state in consideration of the first movement state by using the acceleration data corresponding to the second time period to create feature data for classifying the plurality of movement activities, determining a threshold value on the basis of the first movement state, and comparing the created feature data with the threshold value to determine the second movement state.

For example, the feature data may be an average magnitude of the acceleration data. When the average magnitude of the acceleration data is less than a threshold value, the controller 170 may determine the movement state of the user in the second time period as the stationary state.

In this case, the threshold value is determined as a first threshold value when the movement state of the user of the device in the first time period is the stop state. The threshold value is determined as a second threshold value when the movement state of the user of the device in the first time period is not the stop state. The first threshold value may be less than the second threshold value.

In addition, the controller 170 may determine a place where the user is located on the basis of the determined first movement state and second movement state.

For example, the controller 170 may determine a frequency of at least one of the plurality of movement activities with respect to time on the basis of the movement state of the user with respect to time and may determine the place where the user is located at a time when the acceleration data is acquired on the basis of the frequency of the at least one of the plurality of movement activities with respect to time.

The controller 170 may also determine the movement pattern of the user on the basis of the movement state of the user with respect to time.

The controller 170 may also determine the movement objective of the user on the basis of the movement state of the user and the movement pattern of the user.

The controller 170 may also provide a service associated with the movement objective.

Upon determining the place where the user is located, the controller 170 may acquire the location information of the device from the location sensor included in the device.

The display unit 110 may display the movement state of the user. The display unit 110 may also display the location information of the determined place. The display unit 110 may also display information regarding the movement pattern of the user.

Figure 22:
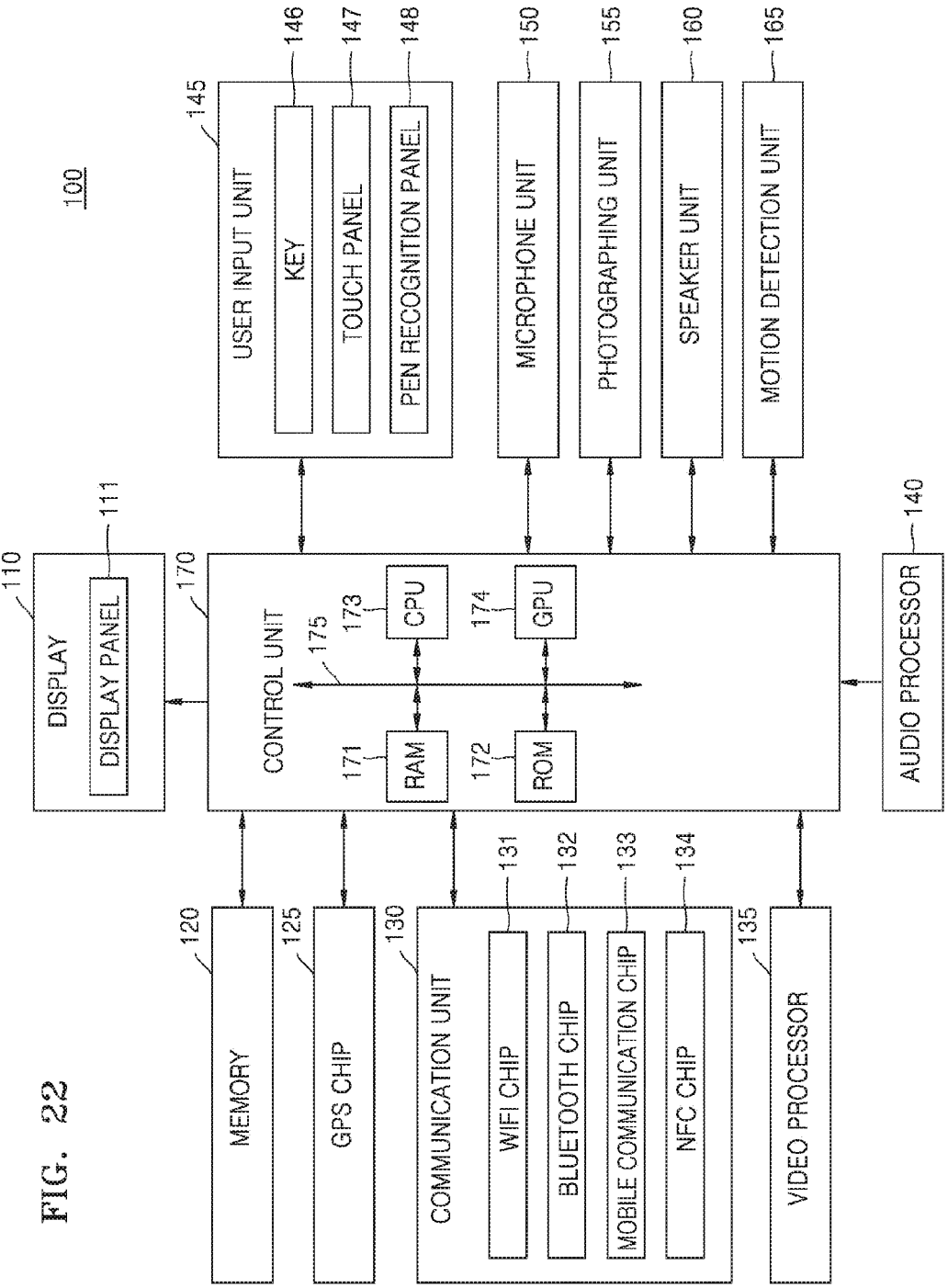
FIG. 22 is a block diagram showing a configuration of a device according to an embodiment of the present disclosure.

FIG. 22 is a block diagram showing a configuration of a device 100 according to another embodiment of the present disclosure.

Referring to FIG. 22, the configuration of the device 100 may be applied to various types of devices such as a cellular phone, a tablet personal computer (PC), a personal digital assistant (PDA), a Moving Picture Experts Group phase 1 or phase 2 (MPEG-1 or MPEG-2) audio layer 3 (MP3) player, a kiosk, an electronic frame, a navigation device, a digital television (TV), and a wearable device, e.g., a smart watch, a wrist watch, a smart glass, or a head-mounted display (HMD).

Referring to FIG. 22, the device 100 may include at least one of a display unit 110, a controller 170, a memory 120, a GPS chip 125, a communication unit 130, a video processor 135, an audio processor 140, a user input unit 145, a microphone 150, a capture unit 155 (e.g., a photographing unit), a speaker unit 160, and a motion detection unit 165.

The display unit 110 may include a display panel 111 and a controller (not shown) that controls the display panel. The display panel 111 may be implemented with various displays such as a liquid crystal display (LCD), an organic light-emitting diode (OLED) display, an active-matrix OLED (AM-OLED), a plasma display panel (PDP), etc. The display panel 111 may be implemented to be flexible, transparent, or wearable. The display unit 110 may be combined with a touch panel 147 of the user input unit 145 and provided as a touch screen (not shown). For example, the touch screen (not shown) may include an integrated module in which the display panel 111 and the touch panel 147 are stacked.

The memory 120 may include at least one of an internal memory (not shown) and an external memory (not shown).

The internal memory may include, for example, at least one of a volatile memory (e.g., a dynamic random access memory (DRAM), a static RAM (SRAM), a synchronous dynamic RAM (SDRAM), etc.), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), and a solid state drive (SSD). According to an embodiment, the controller 170 may load instructions or data received from at least one of a non-volatile memory and other components to a volatile memory and may process the loaded instructions or data. In addition, the controller 170 may store data, which is received from another component or created, in the non-volatile memory.

The external memory may include, for example, at least one of a compact flash (CF), secure digital (SD), micro-SD, mini-SD, extreme digital (xD), and a memory stick.

The memory 120 may store various types of programs and data that are used in an operation of the device 100.

The controller 170 may control the display unit 110 such that some content stored in the memory 120 is displayed on the display unit 110. In other words, the controller 170 may display some content stored in the memory 120 on the display unit 110. Alternatively, when a user gesture is detected in a region of the display unit 110, the controller 170 may perform a control operation corresponding to the user gesture.

The controller 170 may include at least one of a RAM 171, a ROM 172, a central processing unit (CPU) 173, a graphics processing unit (GPU) 174, and a bus 175. The RAM 171, the ROM 172, the CPU 173, and the GPU 174 may be connected to one another via the bus 175.

The CPU 173 accesses the memory 120 to perform booting using an operating system (OS) stored in the memory 120. The CPU 173 performs various operations using various types of programs, content, and data that are stored in the memory.

A set of system booting instructions or the like are stored in the ROM 172. As an example, when a turn-on instruction is input to supply power, the device 100 allows the CPU 173 to copy an OS stored in the memory 120 to the RAM according to an instruction stored in the ROM 172 and execute the OS to boot a system. When the booting is completed, the CPU 173 copies various types of programs stored in the memory 120 to the RAM 171 and executes the programs copied to the RAM 171 to perform various types of operations. When the booting of the mobile device 100 is completed, the GPU 174 displays a user interface (UI) screen in a region of the display unit 110. In detail, the GPU 174 creates a screen on which an electronic document including various objects such as content, an icon, a menu, etc. is displayed. The GPU 174 calculates an attribute value such as coordinate values, a form, a size, a color, etc. through which each object is displayed according to a layout of the screen. Further, the GPU 174 may create a screen of various layouts including the objects based on the calculated attribute value. The screen created by the GPU 174 may be provided to the display unit 110 and may be displayed in each region of the display unit 110.

The GPS chip 125 may receive GPS signals from GPS satellites to calculate a current location of the device 100. The controller 170 may calculate a user's location by using the GPS chip 125 when a navigation program is used or a current location of the user is required.

The communication unit 130 may communicate with various types of external devices according to various types of communication schemes. The communication unit 130 may include at least one of a Wi-Fi chip 131, a Bluetooth chip 132, a mobile communication chip 133 (e.g., wireless) and a near field communication (NFC) chip 134. The controller 170 may communicate with various types of external devices by using the communication unit 130.

The Wi-Fi chip 131 and the Bluetooth chip 132 may communicate in a Wi-Fi scheme and a Bluetooth chip scheme, respectively. When the Wi-Fi chip 131 or the Bluetooth chip 132 is used, the communication unit 130 may transmit and receive various types of connection information such as a service set Identifier (SSID) and a session key, establish a communication connection using the transmitted and received connection information, and then transmit and receive various types of information. The mobile communication chip 133 is a chip that performs communication according to various communication specifications such as the Institute of Electrical and Electronics Engineers (IEEE) communication standards, Zigbee, 3rd Generation (3G), 3rd Generation Partnership Project (3GPP), and long term evolution (LTE). The NFC chip 134 is a chip that operates by an NFC scheme using a bandwidth of 13.56 MHz among a variety of radio frequency identification (RFID) frequency bandwidths of 135 kHz, 13.56 MHz, 433 MHz, 860-960 MHz, 2.45 GHz, etc.

The video processor 135 may process content received through the communication unit 130 or video data included in content stored in the memory 120. The video processor 135 may perform various image processing operations, such as decoding, scaling, noise filtering, frame rate conversion, and resolution conversion, on the video data.

The audio processor 140 may process content received through the communication unit 130 or audio data included in content stored in the memory 120. The audio processor 140 may perform various processing operations, such as decoding, amplification, and noise filtering, on the audio data.

When a reproduction program for multimedia content is executed, the controller 170 drives the video processor 135 and the audio processor 140 to reproduce the corresponding content. The speaker 160 may output audio data created by the audio processor 140.

The user input unit 145 may receive various commands from a user. The user input unit 145 may include at least one of a key 146, a touch panel 147, and a pen recognition panel 148.

The key 146 may include various types of keys, such as a mechanical button and a wheel, which are formed in various regions such as a front surface, a side surface, and a rear surface of an exterior of a main body of the device 100.

The touch panel 147 may sense a touch input of a user and may output a touch event value corresponding to the sensed touch signal. When the touch panel 147 is combined with the display panel 111 to form a touch screen (not shown), the touch screen may be implemented using various types of touch sensors using a capacitive scheme, a resistive scheme, a piezoelectric scheme, etc. The capacitive scheme corresponds to a scheme of calculating touch coordinates by using a dielectric coated on a surface of a touch screen to sense a minute amount of electricity caused by a user's body when a part of the user's body touches the surface of the touch screen. The resistive scheme corresponds to a scheme of calculating touch coordinates by including two electrode plates in the touch screen to sense an electric current that flows when the two electrode plates, that is, upper and lower plates come in contact with each other when the user touches the screen. A touch event generated in the touch screen may be usually caused by a human finger or may also be caused by an object having a conductive material that may change capacitance.

The pen recognition panel 148 may sense a pen proximity input or a pen touch input according to an operation of a user's touch pen (e.g. a stylus pen and a digitizer pen) and may outputs the sensed pen proximity event or pen touch event. The pen recognition panel 148 may be implemented by an electromagnetic resonance (EMR) scheme to sense a touch input or proximity input according to the change in intensity of an electromagnetic field caused by the proximity or touch of the pen. In detail, the pen recognition panel 148 may include an electromagnetic induction coil sensor (not shown) having a grid structure and an electromagnetic signal processing unit (not shown) for sequentially providing an alternating signal having a predetermined frequency to loop coils of the electromagnetic induction coil sensor. When a pen having a resonance circuit is located in the vicinity of the loop coils of such a pen recognition panel 148, a magnetic field generated from the corresponding loop coil causes an electric current based on mutual electromagnetic induction to be generated in the resonance circuit of the pen. Based on the electric current, an induced magnetic field is generated from the coil constituting the resonance circuit of the pen, and the pen recognition panel 148 may detect the induced magnetic field from the loop coil in a signal reception state to sense a proximity location or a touch location of the pen. The pen recognition panel 148 may be provided to have a predetermined area in a lower portion of the display panel 111, for example, an area that may cover a display area of the display panel 111.

The microphone 150 may receive an input of a user's voice or other sound and convert the received input into audio data. The controller 170 may use the user's voice input through the microphone 150 at a voice call operation or may convert the input into audio data to store the audio data in the memory 120.

The capture unit 155 may capture a still image or a moving image under the control of a user. A plurality of capture units 155 may be implemented, such as a front camera and a rear camera.

When the capture unit 155 and the microphone 150 are provided, the controller 170 may perform a control operation according to the user's voice input through the microphone 150 or the user's motion recognized by the capture unit 155. For example, the device 100 may operate in a motion control mode or a voice control mode. When the device 100 operates in the motion control mode, the controller 170 may activate the capture unit 155 to capture a user and may track the change in the user's motion to perform a control operation corresponding to the tracked change. When the device 100 operates in the voice control mode, the controller 170 may analyze the user's voice input through the microphone 150 and may operate in a voice recognition mode of performing a control operation according to the analyzed voice.

The motion detection unit 165 may sense a movement of a main body of the device 100. The device 100 may be rotated or inclined in various directions. In this case, the motion detection unit 165 may sense movement characteristics such as a rotation direction, a rotation angle, and an inclination by using at least one of various sensors such as a geomagnetic sensor, a gyro sensor, and an accelerometer 163.

In addition, although not illustrated in FIG. 22, in an embodiment of the present disclosure, the device 100 may further include a universal series bus (USB) port for connecting to a USB connector, various external input ports for connecting to various external terminals such as a headset, a mouse, and a local area network (LAN), a digital multimedia broadcasting (DMB) chip for receiving and processing a DMB signal, and various other sensors.

The names of the components of the aforementioned device 100 may be changed. Further, the device 100 according to the present disclosure may be configured to include at least one of the aforementioned components and may be configured to remove some components or add additional other components.

An embodiment of the present disclosure may be implemented as a non-transitory computer-readable medium including computer-executable instructions such as computer-executable program module. The non-transitory computer-readable medium may be any usable medium accessible by a computer and may include volatile and non-volatile media and discrete and integrated media. Also, the non-transitory computer-readable medium may include both a computer storage medium and a communication medium. The computer storage medium includes the volatile and non-volatile media and the discrete and integrated media, which are implemented in any method or technique for storing information such as a computer readable instruction, data structure, program module, or other data. The communication module typically includes the computer readable instruction, data structure, program module, or other data and transmission mechanism of a modulated data signal such as a carrier and further includes any information transmission medium.

The above description is merely illustrative, and it will be understood by those skilled in the art that various changes in form and details may be made therein without departing from the spirit and scope of the disclosure as defined by the appended claims. The above embodiments are accordingly to be regarded as illustrative rather than restrictive. For example, while a single element may be distributed and then carried out, distributed elements may be carried out in a combination thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device comprising:
an accelerometer configured to measure an acceleration of the device;
at least one processor configured to:
acquire acceleration data of the device in a first time period and a second time period adjacent to the first time period from the accelerometer,
determine a first movement state of a user in the first time period based on the acceleration data corresponding to the first time period, and
determine a second movement state of the user in the second time period in consideration of the acceleration data corresponding to the second time period and the determined first movement state; and
a display configured to display the first movement state and the second movement state,
wherein each of the movement states indicates one of a plurality of predetermined movement activities of the user, and
wherein the plurality of predetermined movement activities includes at least one of a stationary activity, a stop activity, a walking activity, a jogging activity, a cycling activity, and a driving activity.

2. The device of claim 1, wherein the second time period partially overlaps the first time period.

3. The device of claim 1, wherein the at least one processor is further configured to:
create feature data for classifying the plurality of movement activities using the acceleration data corresponding to the first time period, and
determine the movement state of the user in the first time period based on the created feature data.

4. The device of claim 3, wherein the created feature data for classifying the plurality of movement activities is at least one of a magnitude, standard deviation, frequency, and energy of the acceleration data.

5. The device of claim 1, wherein the at least one processor is further configured to determine the second movement state in consideration of the first movement state by determining the second movement state based on a possibility of occurrence of each of the plurality of movement activities as a next movement state of the first movement state when the first movement state occurs in the first time period.

6. The device of claim 1, wherein the at least one processor is further configured to:
determine the second movement state in consideration of the first movement state by further using the acceleration data corresponding to the second time period to create feature data for classifying the plurality of movement activities,
determine a threshold value based on the first movement state, and
compare the created feature data with the threshold value to determine the second movement state.

7. The device of claim 6,
wherein the created feature data is an average magnitude of the acceleration data,
wherein, the at least one processor is further configured to determine the movement state of the user in the second time period as a stationary state when the average magnitude of the acceleration data is less than the threshold value, and
wherein, the threshold value is determined as a first threshold value when the movement state of the user of the device in the first time period is a stop state and is determined as a second threshold value when the movement state of the user of the device in the first time period is not the stop state, the first threshold value being less than the second threshold value.

8. The device of claim 1, wherein the at least one processor is further configured to determine a place where the user is located based on the determined first movement state and second movement state.

9. The device of claim 8,
wherein the at least one processor is further configured to acquire location information of the device from a position sensor included in the device upon determining the place where the user is located, and
wherein the display is further configured to display the acquired location information as location information of the determined place.

10. A method of recognizing a user activity, the method comprising:
acquiring acceleration data of a device in a first time period and a second time period adjacent to the first time period from an accelerometer;
determining a first movement state of a user of the device in the first time period based on the acceleration data corresponding to the first time period;
determining a second movement state of the user in the second time period in consideration of the acceleration data corresponding to the second time period and the determined first movement state; and
displaying the first movement state and the second movement state,
wherein each of the movement states indicates one of a plurality of predetermined movement activities of the user, and
wherein the plurality of predetermined movement activities includes at least one of a stationary activity, a stop activity, a walking activity, a jogging activity, a cycling activity, and a driving activity.

11. The method of claim 10, wherein the second time period partially overlaps the first time period.

12. The method of claim 10, wherein the determining of the first movement state of the user of the device in the first time period comprises:
creating feature data for classifying the plurality of movement activities using the acceleration data corresponding to the first time period; and
determining the movement state of the user in the first time period based on the created feature data.

13. The method of claim 10, wherein the determining of the second movement state of the user in the second time period in consideration of the acceleration data corresponding to the second time period and the determined first movement state comprises determining the second movement state based on a possibility of occurrence of each of the plurality of movement activities as a next movement state of the first movement state when the first movement state occurs in the first time period.

14. The method of claim 10, wherein the determining of the second movement state of the user in the second time period in consideration of the acceleration data corresponding to the second time period and the determined first movement state further comprises:
using the acceleration data corresponding to the second time period to create feature data for classifying the plurality of movement activities and determining a threshold value based on the first movement state; and
comparing the created feature data with the threshold value to determine the second movement state.

15. The method of claim 14,
wherein the feature data is an average magnitude of the acceleration data,
wherein the comparing of the created feature data with the threshold value to determine the second movement state comprises determining the movement state of the user in the second time period as a stationary state when the average magnitude of the acceleration data is less than the threshold value, and
wherein the threshold value is determined as a first threshold value when the movement state of the user of the device in the first time period is a stop state and is determined as a second threshold value when the movement state of the user of the device in the first time period is not the stop state, the first threshold value being less than the second threshold value.

16. The method of claim 10, further comprising:
determining a place where the user is located based on the determined first movement state and second movement state.

17. The method of claim 16, further comprising:
acquiring location information of the device from a position sensor included in the device upon determining the place where the user is located; and
displaying the acquired location information as location information of the determined place.

18. A non-transitory computer-readable recording medium configured to store one or more computer programs including instructions that, when executed by at least one processor, cause the at least one processor to control for:
acquiring acceleration data of a device in a first time period and a second time period adjacent to the first time period from an accelerometer;
determining a first movement state of a user of the device in the first time period based on the acceleration data corresponding to the first time period;
determining a second movement state of the user in the second time period in consideration of the acceleration data corresponding to the second time period and the determined first movement state; and
displaying the first movement state and the second movement state,
wherein each of the movement states indicates one of a plurality of predetermined movement activities of the user, and
wherein the plurality of predetermined movement activities includes at least one of a stationary activity, a stop activity, a walking activity, a jogging activity, a cycling activity, and a driving activity.

* * * * *